US012396066B2

(12) United States Patent
Warwick

(10) Patent No.: US 12,396,066 B2
(45) Date of Patent: Aug. 19, 2025

(54) HEATER CONTROL FOR COUNTERTOP APPLIANCE

(71) Applicant: National Presto Industries, Inc., Eau Claire, WI (US)

(72) Inventor: Julian Warwick, Jim Falls, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

(21) Appl. No.: 18/617,339

(22) Filed: Mar. 26, 2024

(65) Prior Publication Data

US 2024/0244715 A1 Jul. 18, 2024

Related U.S. Application Data

(60) Continuation of application No. 17/357,507, filed on Jun. 24, 2021, now Pat. No. 11,968,753, which is a division of application No. 16/196,561, filed on Nov. 20, 2018, now abandoned.

(60) Provisional application No. 62/640,952, filed on Mar. 9, 2018, provisional application No. 62/588,741, filed on Nov. 20, 2017.

(51) Int. Cl.
*H05B 1/02* (2006.01)
*H05B 3/68* (2006.01)

(52) U.S. Cl.
CPC ............. *H05B 1/0266* (2013.01); *H05B 3/68* (2013.01)

(58) Field of Classification Search
CPC .......... H05B 1/0266; H05B 3/68; A47J 37/10; A47J 37/105
USPC .................................................... 219/448.17
See application file for complete search history.

(56) References Cited

U.S. PATENT DOCUMENTS

| | | | | |
|---|---|---|---|---|
| 2,744,995 | A | 5/1956 | Jepson | |
| 3,095,498 | A | 6/1963 | Foster | |
| 6,109,784 | A * | 8/2000 | Weiss | G01K 7/42 374/E7.042 |
| 2007/0204858 | A1 | 9/2007 | Abelbeck | |
| 2013/0068751 | A1 * | 3/2013 | Jinzhao | H05B 1/0266 219/448.11 |
| 2015/0338146 | A1 | 11/2015 | Siemens | |
| 2017/0067648 | A1 | 3/2017 | Norman | |
| 2019/0298104 | A1 * | 10/2019 | Balsamo | E05D 3/18 |

* cited by examiner

*Primary Examiner* — Elizabeth M Kerr
*Assistant Examiner* — Simpson A Chen
(74) *Attorney, Agent, or Firm* — Kenneth A. Smith

(57) ABSTRACT

A countertop appliance temperature controller configured to provide improved temperature control of a resistive heating element heated cooking surface of a countertop appliance through the use of a noncontact thermal sensor. The temperature controller including a pair of electrical output contacts selectively coupleable to the resistive heating element of the countertop appliance, a user input configured to receive a desired temperature setpoint for the cooking surface of the countertop appliance, a noncontact temperature sensor configured to receive temperature information directly from the cooking surface of the countertop appliance, and a thermostat configured to adjust an electrical output of the pair of electrical output contacts to minimize a difference between the desired temperature setpoint and a perceived actual temperature of the cooking surface based on the received temperature information.

19 Claims, 22 Drawing Sheets

HEATER CONTROL FOR COUNTERTOP APPLIANCE

CROSS REFERENCE TO RELATED APPLICATIONS

This application is a Continuation of and claims the benefit of U.S. Nonprovisional application Ser. No. 17/357,507 filed Jun. 24, 2021, which claims the benefit of application Ser. No. 16/196,561 (filed Nov. 20, 2018), which claims the benefit of U.S. Provisional Application Nos. 62/588,741 (filed Nov. 20, 2017) and 62/640,952 (filed Mar. 9, 2018), the contents of which are fully incorporated herein by reference.

TECHNICAL FIELD

The present disclosure is directed to countertop appliances for preparing food. More specifically, the present disclosure is directed to a control system that uses a thermal sensor arranged to measure an appliance temperature so as to provide consistent temperature control and avoid large temperature swings during food preparation.

BACKGROUND

Countertop appliances for preparing food including, for example, slow cookers, multi-cookers, griddles and skillets are well known and are frequently used to prepare a variety of food types. Traditionally, these countertop appliances have utilized detachable temperature controllers that include a relatively large temperature probe with an embedded thermocouple to measure temperature. Typically, these temperature probes are insertable into a probe cavity such that the temperature probe is in physical contact with a lower side of a cooking surface. Due to the large size of the temperature probe, the physical contact with a lower surface of the cooking surface and the overall large heat sink encompassed by material that makes up the cooking surface, the measurements of the thermocouple within the temperature probe tend to trail the cooking surface temperature as the cooking surface is being heated and conversely the temperature measurements of the thermocouple tend to remain above the temperature of the cooking surface as the cooking surface is cooling and/or not being heated. As such, existing temperature probes make it difficult to maintain a consistent, desired temperature during cooking.

Due to the lagging and leading nature of existing countertop appliance temperature probes and the accompanying inefficiencies of said probes, it would be advantageous to improve upon conventional designs for monitoring and controlling the temperature of countertop appliances.

SUMMARY

The present disclosure provides a temperature controlling apparatus and method of use for consistent and efficient temperature control of a countertop appliance through the use of a temperature sensor that avoids both self-heating and heat retention such that the temperature sensor avoids coloring or impacting a response provided to a temperature control. For example, a representative temperature sensor for use in the present disclosure can comprise a noncontact temperature sensor such as an infrared or thermopile sensor. Alternatively, the temperature sensor can comprise either a linear or nonlinear NTC (Negative Temperature Coefficient) sensor. In the case of a noncontact temperature sensor, the noncontact temperature sensor can be positioned so as to face or be in proximity to a cooking surface without being placed in physical contact with the cooking surface. In one representative embodiment, the noncontact temperature sensor can comprise an infrared sensor that is positioned to directly measure the temperature of the cooking surface. In another representative embodiment, the temperature sensor can be located within a controller body so as to read a resilient temperature member that is in physical contact with a projecting rib on the appliance. As the noncontact temperature sensor allows for temperature measurement without heat conduction, the noncontact temperature sensor is able to measure the actual cooking surface temperature in real time. By measuring and communicating the cooking surface temperature to a temperature controller in real time, the temperature controller can respond immediately to any temperature changes and therefore enables the cooking temperature to be controlled and maintained in a consistent manner without experiencing large temperature over and undershoots. In one embodiment, the countertop appliance can utilize a temperature sensor that avoids self-heating and heat retention such that the temperature sensor avoids coloring or impacting a response provided to a temperature control. In one embodiment, the temperature sensor can be a noncontact temperature sensor, such as an infrared sensor or thermopile to measure a cooking surface temperature in real-time.

Another embodiment of the present disclosure provides a countertop appliance temperature controller configured to provide an improved temperature control of a resistive heating element heated cooking surface of a countertop appliance through the use of a noncontact thermal sensor. The temperature controller can include a pair of electrical output contacts selectively coupleable to the resistive heating element of the countertop appliance; a user input configured to receive a desired temperature setpoint for the cooking surface of the countertop appliance; a noncontact temperature sensor configured to receive temperature information directly from the cooking surface of the countertop appliance; and a thermostat configured to adjust an electrical output of the pair of electrical output contacts to minimize the difference between the desired temperature setpoint and a perceived actual temperature of the cooking surface based on the received temperature information.

In one embodiment, the noncontact sensor can be configured to receive temperature information directly from the cooking surface for the purpose of inferring the perceived actual temperature of the cooking surface in real-time. In one embodiment, the noncontact sensor is configured to face the cooking surface for receiving radiative temperature information directly from the cooking surface. In one embodiment, the noncontact temperature sensor is spaced apart from the cooking surface to minimize conductive heating from the cooking surface. In one embodiment, the noncontact temperature sensor is a low thermal capacitance sensor configured to minimize heat retention to avoid coloring a perceived actual temperature of the cooking surface. In one embodiment, the noncontact temperature sensor is at least one of a negative coefficient thermistor, a resistive temperature detector (RTD) a thermocouple, an infrared sensor, and/or a thermopile. In one embodiment, the user input is at least one of a rotating temperature control dial, one or more buttons, a touchscreen, and/or a signal receiver configured to receive external commands from a remote device. In one embodiment, the temperature controller further includes a display configured to display the desired temperature setpoint, received temperature information, the perceived actual temperature of the cooking surface, or a combination thereof.

Another embodiment of the present disclosure provides a countertop appliance having improved cooking surface temperature control. The countertop appliance can include a cooking surface, a resistive heating element configured to heat the cooking surface, and a temperature controller. The temperature controller can include an electrical output operably coupled to the resistive heating element; a user input configured to receive a desired temperature setpoint for the cooking surface; a noncontact temperature sensor configured to receive temperature information directly from the cooking surface; and a thermostat configured to adjust the electrical output to minimize a difference between the desired temperature setpoint and an actual temperature of the cooking surface based on the received temperature information. In one embodiment, the countertop appliance can be at least one of a griddle, skillet, slow cooker, and/or multi-cooker.

Another embodiment of the present disclosure provides a method of improved temperature control of a resistive heating element heated cooking surface of a countertop appliance through the use of a noncontact thermal sensor. The method can include: directly sensing an actual temperature of the cooking surface via a noncontact thermal sensor; and adjusting an electrical output of the resistive heating element to minimize a difference between a desired temperature setpoint and a perceived actual temperature of the cooking surface.

Another embodiment of the present disclosure provides a method of controlling temperature in a countertop appliance. The method can comprise the step of measuring a cooking surface temperature with a temperature sensor that avoids self-heating and heat retention such that the temperature sensor avoids coloring or impacting a response provided to a temperature control. The method can further comprise the step of communicating the cooking surface temperature in real-time to a temperature controller. In some embodiments, the temperature sensor can comprise a noncontact temperature sensor such as an infrared sensor or thermopile.

Another embodiment of the present disclosure provides a countertop appliance temperature controller configured to provide improved temperature control of a resistive heating element of a countertop appliance. The temperature controller can include a pair of electrical output contacts selectively coupleable to the resistive heating element of the countertop appliance; a user input configured to receive a desired temperature setpoint for the resistive heating element; a conductive temperature sensor in conductive heating communication with at least one electrical output contact of the pair of electrical output contacts, so as to receive temperature information from the resistive heating element; and a thermostat configured to adjust an electrical output of the pair of electrical output contacts to minimize the difference between the desired temperature setpoint and a measured temperature of the resistive heating element based on the received temperature information.

Another embodiment of the present disclosure provides a countertop appliance having improved cooking surface temperature control. The countertop appliance can include a cooking surface in conductive heating communication with a projecting rib; a resistive heating element configured to heat the cooking surface and projecting rib; and a temperature controller. The temperature controller can include in electrical output operably coupled to the resistive heating element; a user input configured to receive a desired temperature setpoint for the cooking surface; a temperature sensor configured to receive temperature information from the projecting rib; and a thermostat configured to adjust the electrical output to minimize a difference between the desired temperature setpoint and a perceived actual temperature of the cooking surface based on the received temperature information.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
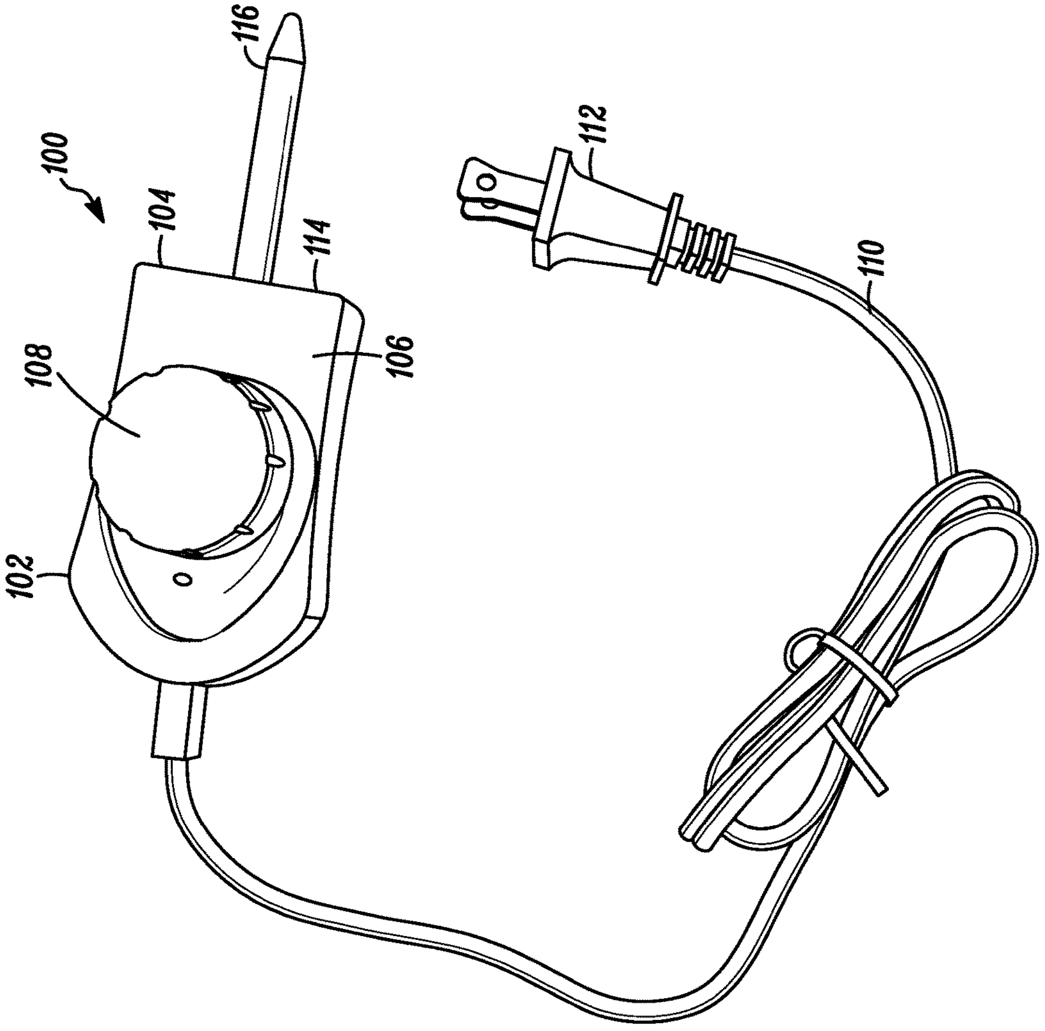
FIG. 1 PRIOR ART
FIG. 1 is a top view depicting a conventional temperature controller according to the prior art.

While various embodiments are amenable to various modifications and alternative forms, specifics thereof have been shown by way of example in the drawings and will be described in detail. It should be understood, however, that the intention is not to limit the claimed disclosures to the particular embodiments described. On the contrary, the intention is to cover all modifications, equivalents, and alternatives falling within the spirit and scope of the subject matter as defined by the claims.

DETAILED DESCRIPTION

Figure 2:
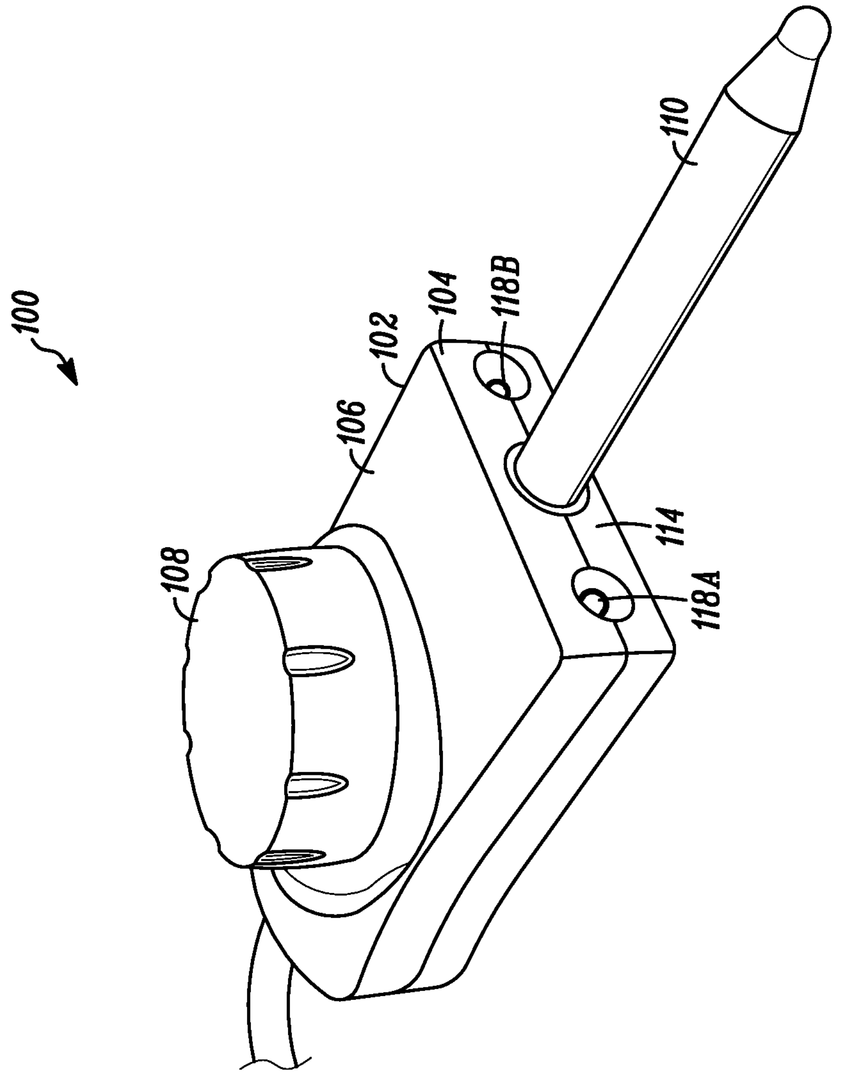
FIG. 2 PRIOR ART
FIG. 2 is a perspective end view depicting the conventional temperature controller of FIG. 1.
Figure 3:
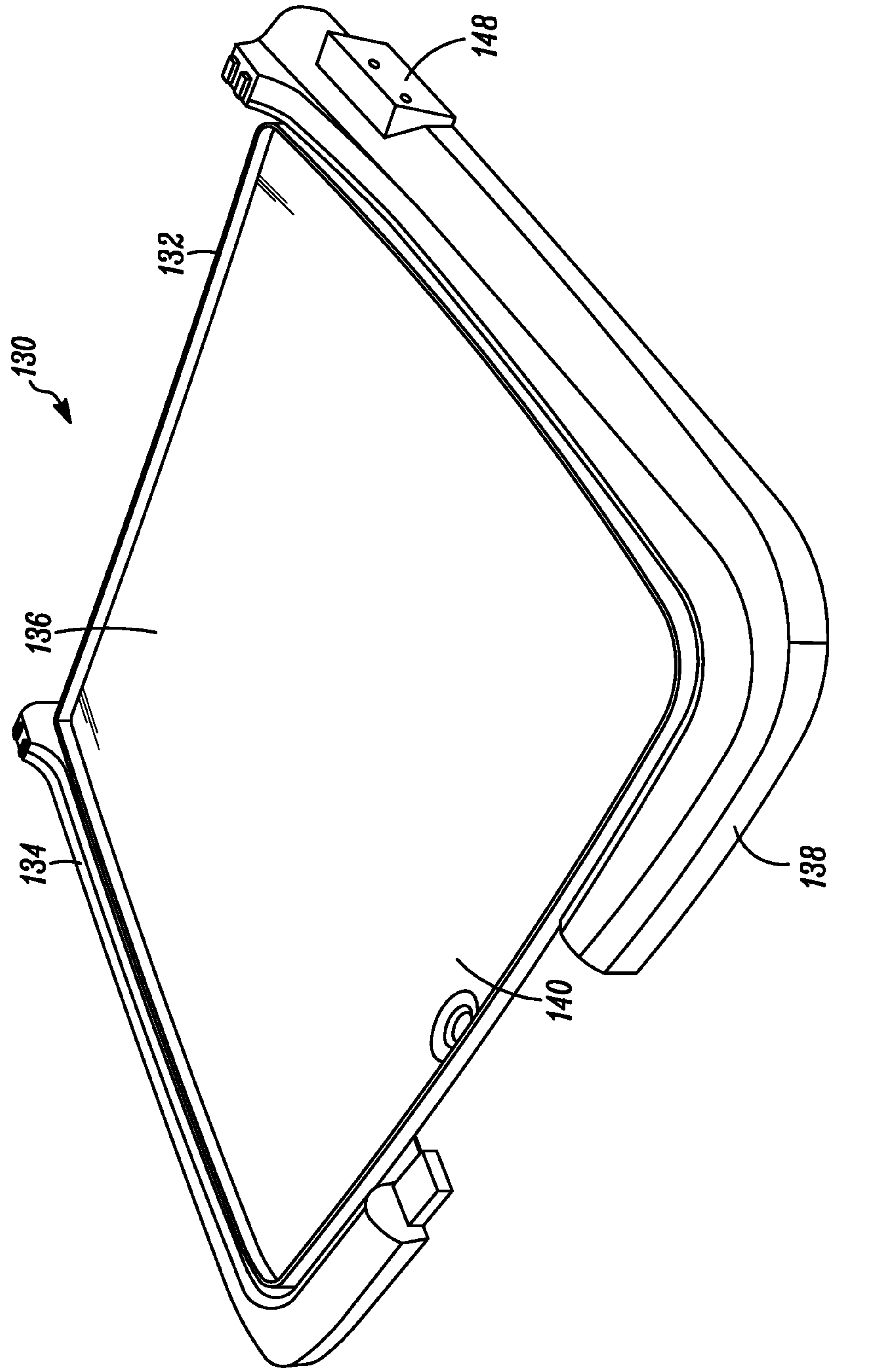
FIG. 3 PRIOR ART
FIG. 3 is a perspective top view depicting a countertop griddle according to the prior art.
Figure 4:
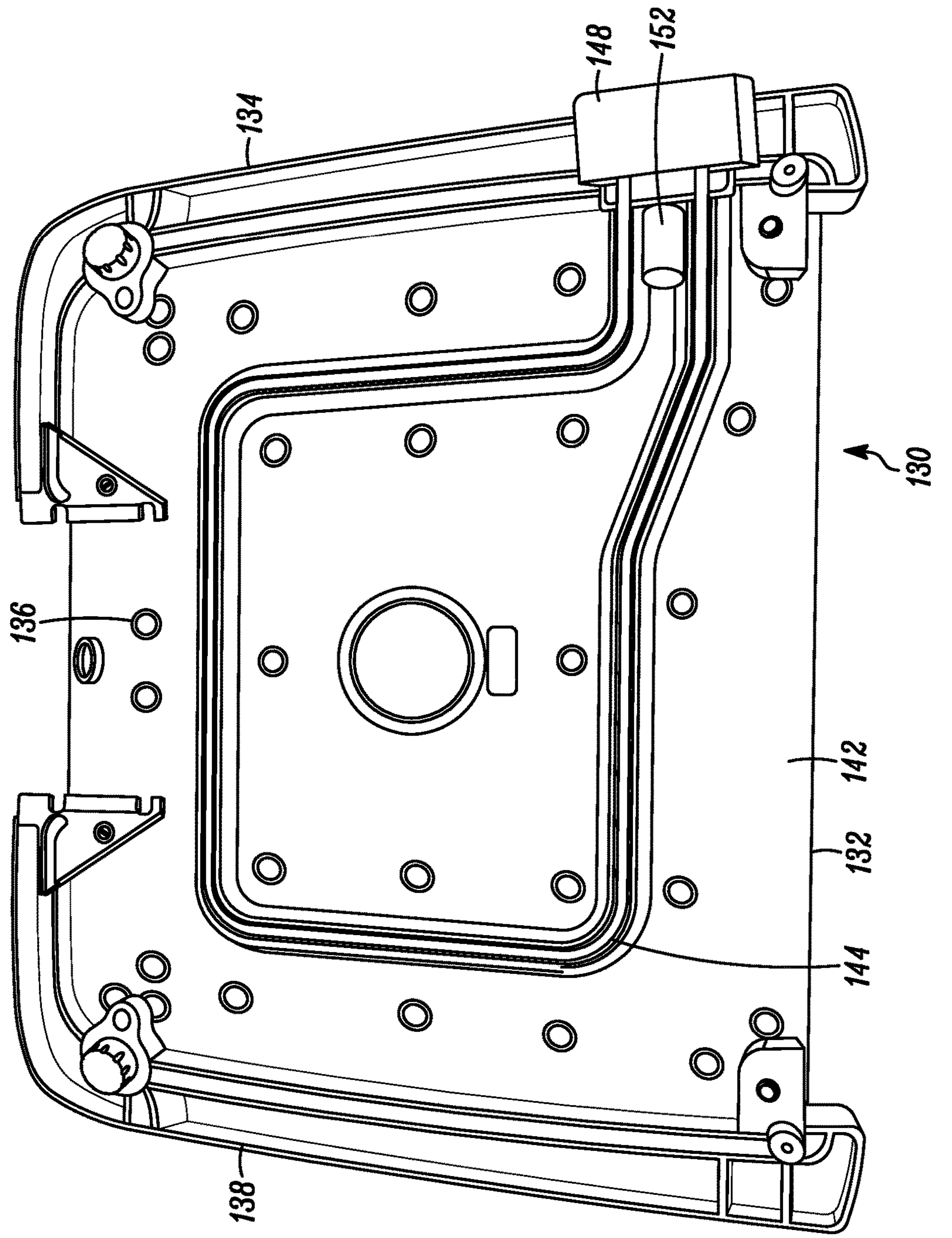
FIG. 4 PRIOR ART
FIG. 4 is a bottom view depicting the countertop griddle of FIG. 3.
Figure 5:
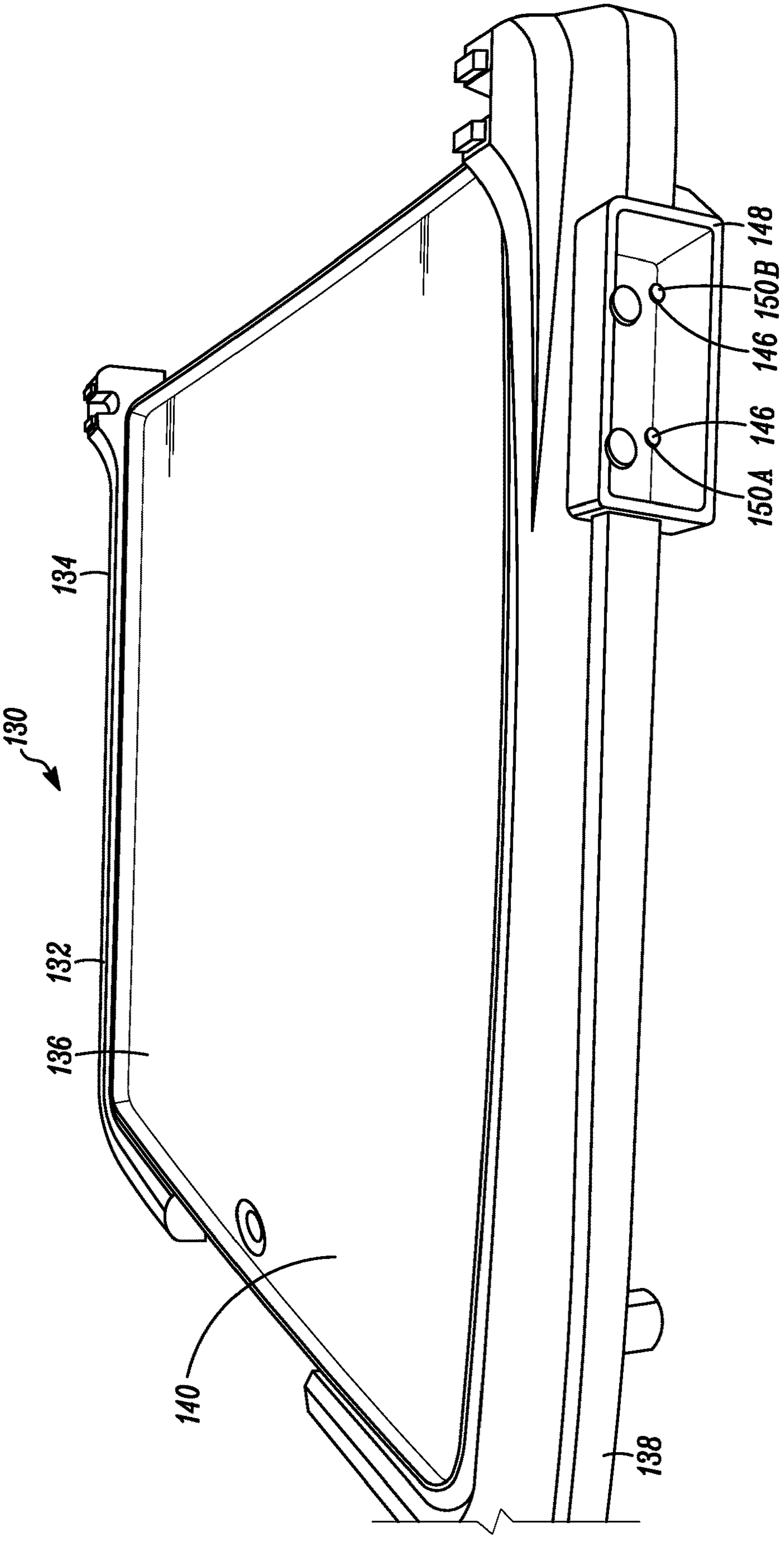
FIG. 5 PRIOR ART
FIG. 5 is a perspective, side view depicting the countertop griddle of FIG. 3.
Figure 6:
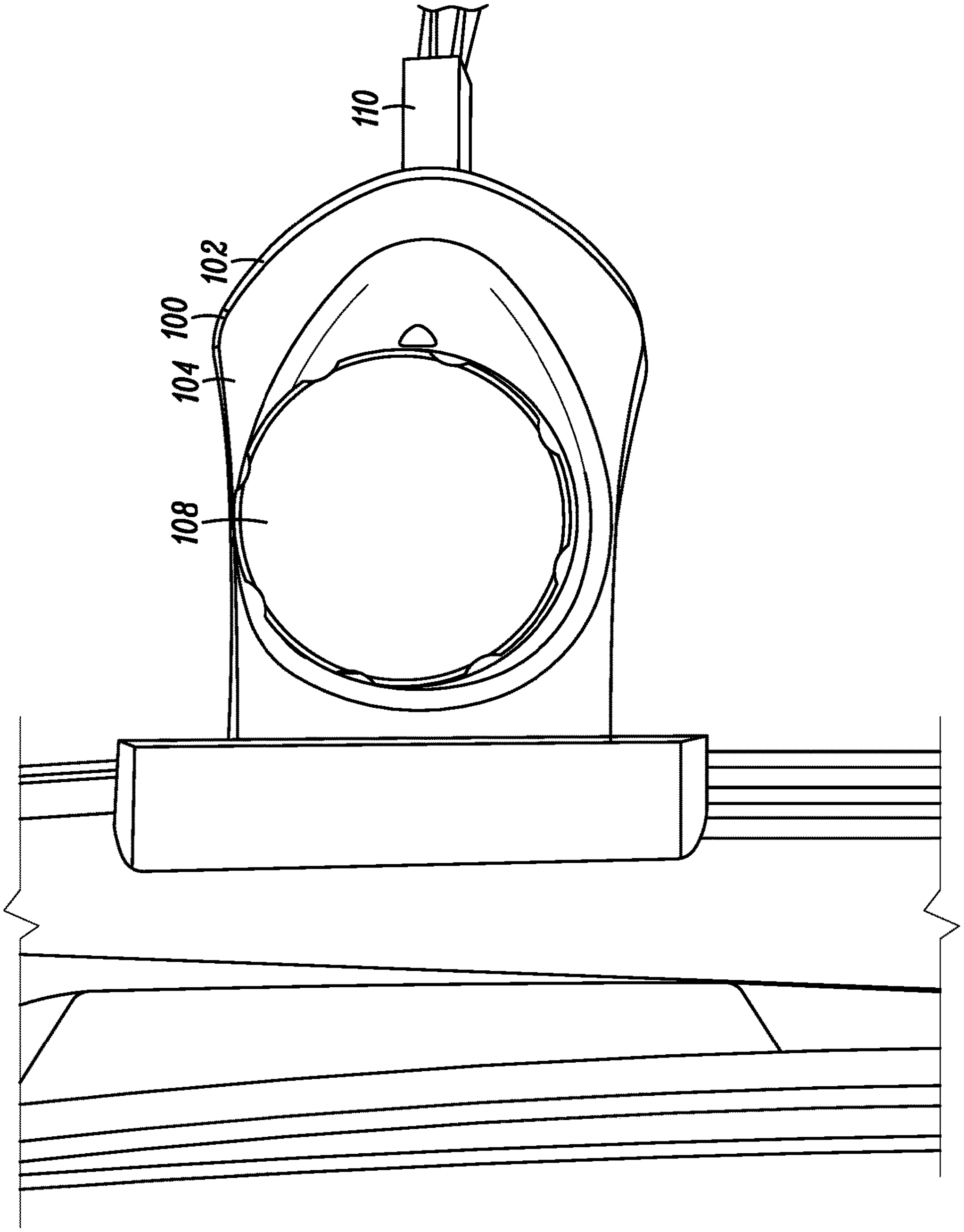
FIG. 6 PRIOR ART
FIG. 6 is a detailed top view depicting the conventional temperature controller of FIG. 1 coupled to the countertop griddle of FIG. 3.

A conventional countertop appliance temperature controller 100 of the prior art is illustrated generally in FIGS. 1, 2 and 6. Generally, the temperature controller 100 comprises a controller body 102 including a connection end 104. The controller body 102 can include an upper surface 106 upon which a temperature control dial 108 is mounted. The controller body 102 can be coupled to an electrical cord 110 including a plug 112 for operably connecting the temperature controller 100 to an electrical power source, as is well known in the art. The connection end 104 can generally be defined as a connection wall 114 from which a temperature probe 116 projects, as well as a pair of electrical contacts 118*a*, 118*b*.

Referring now to FIGS. 3, 4, 5 and 6, a countertop appliance 130 can be configured for connection to and operable control by the countertop appliance temperature controller 100. Though countertop appliance 130 is shown as comprising a griddle 132, it will be understood that the countertop appliance 130 could also comprise a skillet or a slow cooker/multi-cooker or similar countertop appliances that make use of a temperature controller without departing from the spirit and scope of the present disclosure. Griddle 132 generally comprises a body 134 including a cooking surface 136 and a support structure 138. Cooking surface 136 generally comprises an upper surface 140 upon which food to be cooked is placed and a lower surface 142 that includes a heater channel 144 for enclosing and positioning a resistive heating element 146 against the lower surface 142. Generally, the cooking surface 136 is formed of a suitable material, for example, a metallic material, that easily conducts heat such that the resistive heating element 146 can quickly heat the cooking surface 136 and correspondingly the upper surface 140 to a desired heating temperature. Generally, the support structure 138 can comprise a base or legs so as to position the heater channel away from a surface, such as a countertop or table, upon which the countertop appliance is positioned. The support structure 138 further defines a mounting block 148 that is dimensioned to received and retain the connection end 104 of the temperature controller 100. The mounting block 148 generally exposes a pair of heater connectors 150*a*, 150*b* as well as a probe cavity 152. Heater connectors 150*a*, 150*b* are generally configured to connect to the corresponding electrical contact 118*a*, 118*b* while the probe cavity 152 is dimensioned to accommodate insertion of the temperature probe 116.

During conventional operation of the countertop appliance 130, the connection end 104 of the temperature controller 100 is slidably inserted into the mounting block 148 as illustrated in FIG. 6. Said connection of the temperature controller 100 to the countertop appliance 130 electrically connects the electrical contacts 118*a*, 118*b* with the resistive heating element 146, such that the temperature controller 100 selectively supplies electrical current to the resistive heating element 146. At the same time, the temperature probe 116 is placed in proximity to the lower surface 142 such that a thermocouple within the temperature probe 116 can provide temperature information to the temperature controller 100. Using the temperature control dial 108, a user can select a desired temperature for cooking, the temperature controller 100 can selectively power the resistive heating element 146 and the temperature probe 116 can provide temperature feedback to the temperature controller 100 as heat is conducted from the cooking surface 136 to the temperature probe 116.

Figure 7:
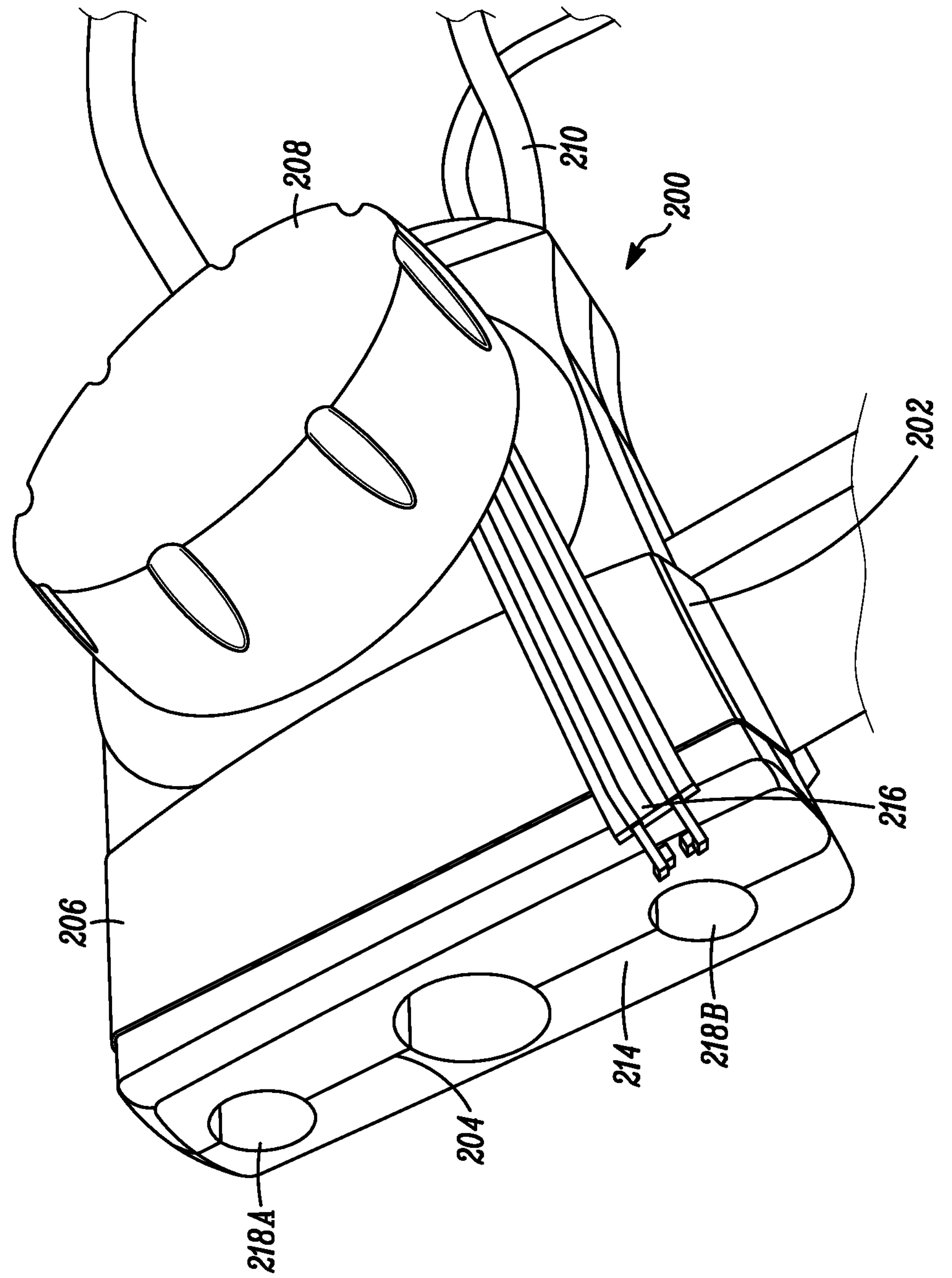
FIG. 7 is a perspective, end view depicting a temperature controller according to a representative embodiment of the present disclosure.
Figure 8:
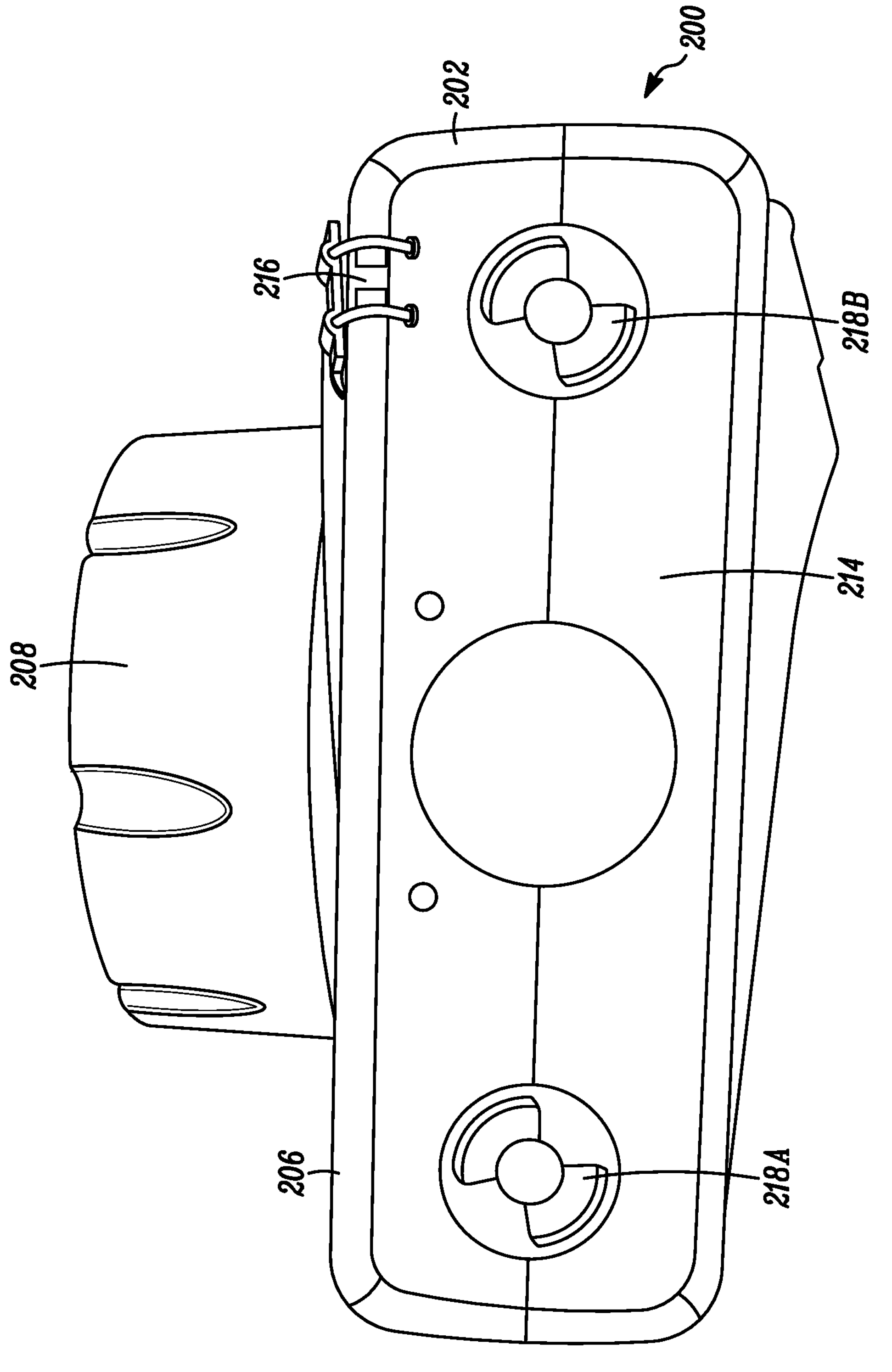
FIG. 8 is an end view depicting the temperature controller of FIG. 7.
Figure 9:
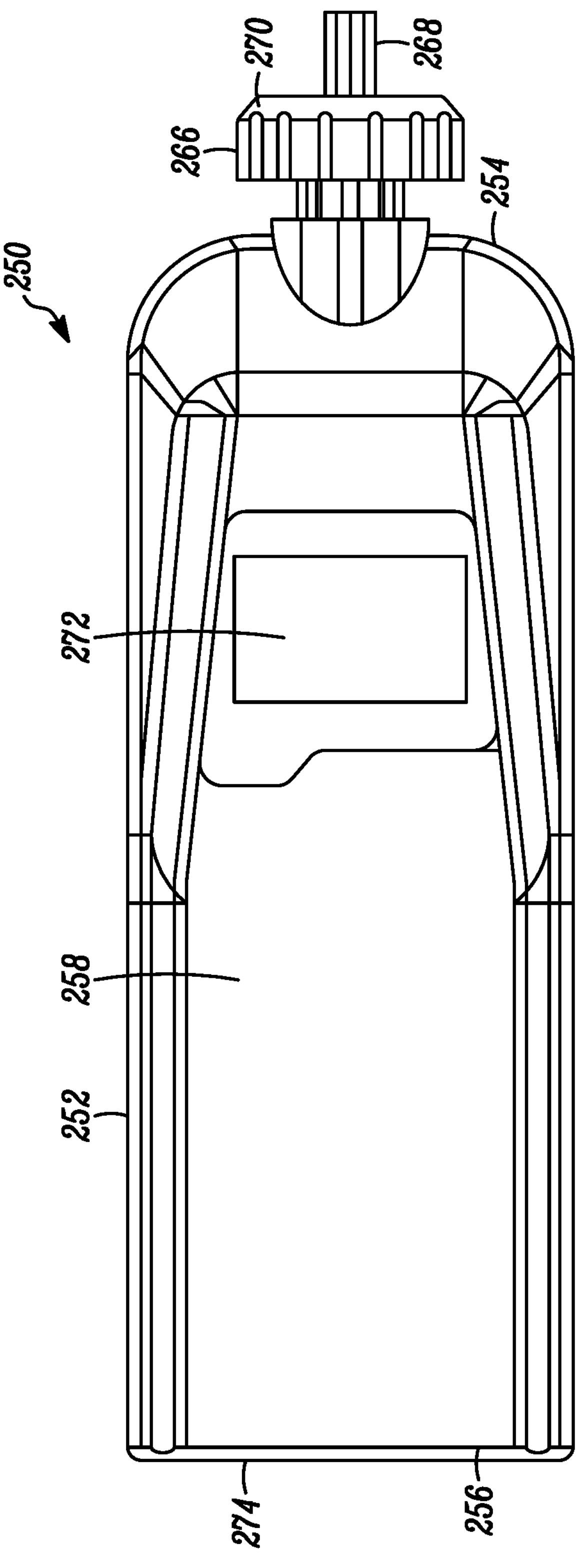
FIG. 9 is a top view depicting a temperature controller according to another representative embodiment of the present disclosure.
Figure 10:
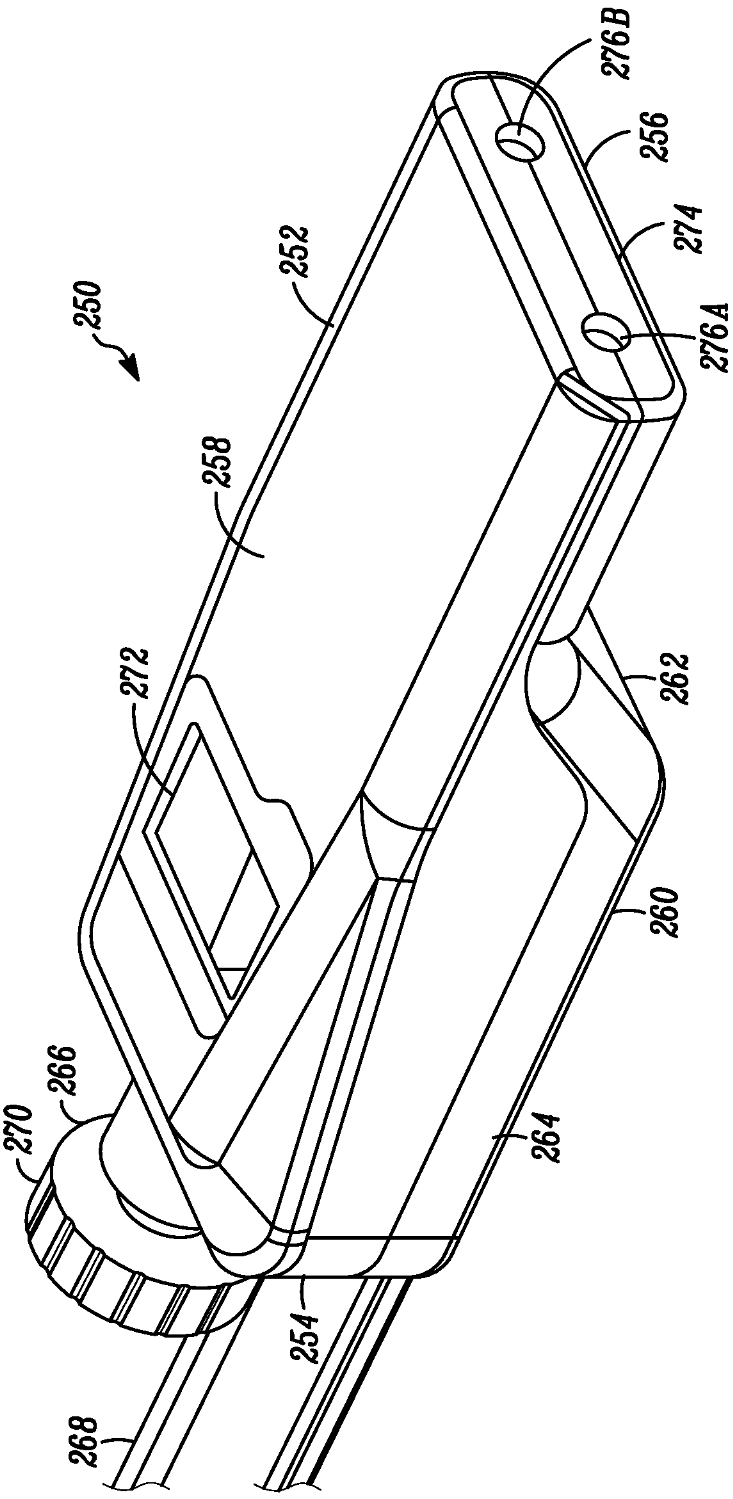
FIG. 10 is a perspective, end view depicting the temperature controller of FIG. 9.
Figure 11:
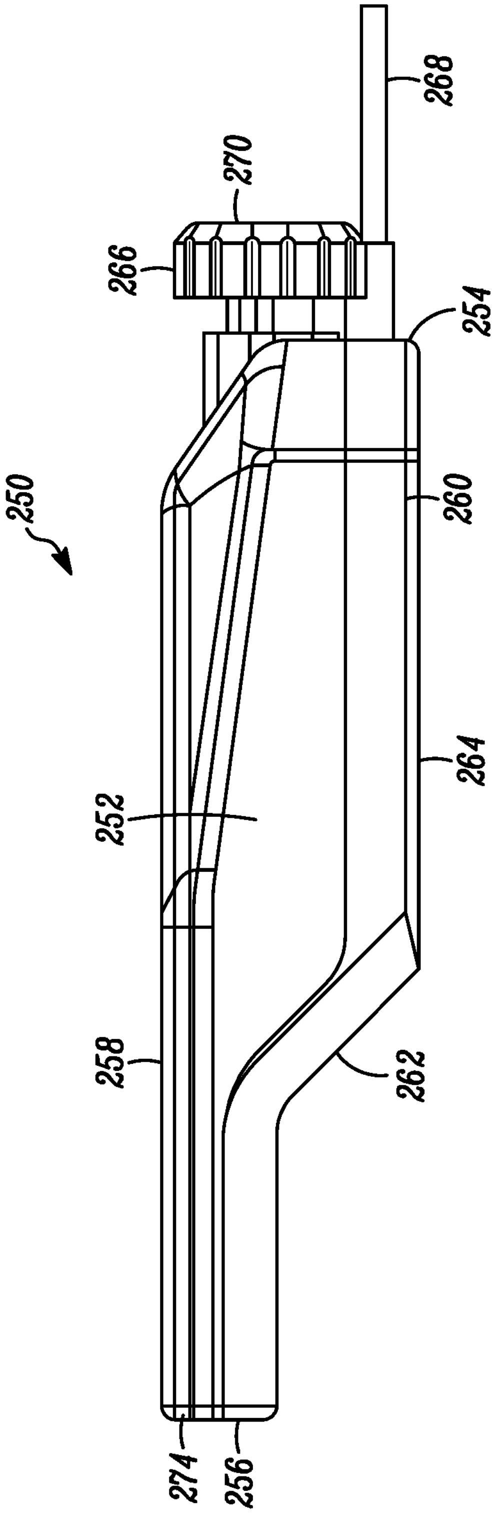
FIG. 11 is a side view depicting the temperature controller of FIG. 9.

FIGS. 7 and 8 illustrate an improved countertop appliance temperature controller 200 according to a representative embodiment of the present disclosure. Preferably, the countertop appliance temperature controller 200 will have a controller body 202 that is substantially similar in size and shape to the controller body 102, such that the countertop appliance temperature controller 200 can be used with new countertop appliances as well as a retrofit or replacement for existing countertop appliance 130. Generally, the controller body 202 includes a connection end 204 and an upper surface 206 having a user input or temperature control dial 208. The controller body 202 can be coupled to an electrical cord 210 including a plug 212 (not shown but similar to plug 112) for operably connecting the temperature controller 200 to an electrical power source.

As illustrated in FIGS. 7 and 8, connection end 204 includes a connection wall 214, a noncontact temperature sensor 216 and a pair of electrical contacts 218*a*, 218*b*. The noncontact temperature sensor 216 can reside anywhere along the connection wall 214 but is generally to be positioned such that when the connection end 204 is attached to the mounting block 148, the noncontact temperature sensor 216 faces the cooking surface 136, but is otherwise spaced apart from and not in contact with the cooking surface 136. As such, the noncontact temperature sensor 216 avoids any conduction of heat directly from the cooking surface 136 to the noncontact temperature sensor 216 itself. The noncontact temperature sensor 216 avoids self-heating and heat retention, so as to avoid coloring or impacting a response provided to a thermostat. The noncontact temperature sensor 216 can comprise an infrared sensor or thermopile that is operably connected to the thermostat and temperature control dial 208.

In operation, the connection end 204 of the countertop appliance temperature controller 200 is slidably inserted into the mounting block 148 in a manner as described and illustrated previously with respect to countertop appliance temperature controller 100. As the connection end 204 is received into the mounting block 148 of the countertop appliance 130, the electrical contacts 218*a*, 218*b* operably engage the resistive heating element 146. At the same time, the noncontact temperature sensor 216 is positioned to face but otherwise avoid direct contact with the cooking surface 136. The user adjusts the temperature control dial 208 to a desired cooking temperature setpoint such that the thermostat selectively powers the resistive heating element and the noncontact temperature sensor 216 provides temperature feedback to the temperature controller 200. In particular, the thermostat can be configured to adjust an electrical output of the pair of electrical output contacts 218*a*, 218*b* to minimize a difference between a desired cooking temperature setpoint established by the temperature control dial 208 and a perceived actual temperature of the cooking surface based on temperature information received by the noncontact temperature sensor 216.

Due to the noncontact operational nature of the noncontact temperature sensor 216, the temperature measurement of the cooking surface 136 is conducted in real-time without any conduction delays as experienced with temperature probe 116. As the temperature measurement is in real-time, the temperature controller 200 immediately responds to temperature changes, thereby cutting off heat or calling for more heat without any lag caused by waiting for conduction to the temperature probe 116. Furthermore, the large temperature over and undershoots resulting from the conduction delay and heat-sink properties of the cooking surface 136, heater channel 144, probe cavity 152 and the temperature probe 116 are eliminated. As such, the actual temperature of the cooking surface can be controlled and maintained in a consistent manner without experiencing large temperature over and undershoots. For instance, the temperature controller 200 can be utilized to maintain a skillet or slow cooker at a low simmer for extended periods of time which is impossible with temperature controller 100 of the prior art.

With reference to FIGS. 9-12, another representative embodiment of a temperature controller 250 is illustrated. Generally, temperature controller 250 can comprise a controller body 252 having a control end 254 and a connection end 256. Controller body 252 can further comprise an upper surface 258 and a lower surface 260. The lower surface 260 can comprise a transition portion 262 between the connection end 256 and a support surface 264 of the lower surface 260. The control end 254 can include a user input 266 and an electrical cord 268. The user input 266 can comprise any of a variety of suitable input mechanism including a rotating knob 270 as illustrated or alternatively, a rotating dial, buttons or a touchscreen. Alternatively, the user input 266 can comprise a signal receiver for receiving external commands such as, for example, from a downloadable application on a smart phone or tablet computer via Bluetooth communications or the like. The upper surface 258 can include a temperature display 272 for displaying one or both of a temperature setpoint and an actual cooking temperature. Connection end 256 is generally sized and shaped for insertion into the mounting block 148. Connection end 256 is generally defined by a connection wall 274 having a pair of electrical contacts 276*a*, 276*b*.

Figure 12:
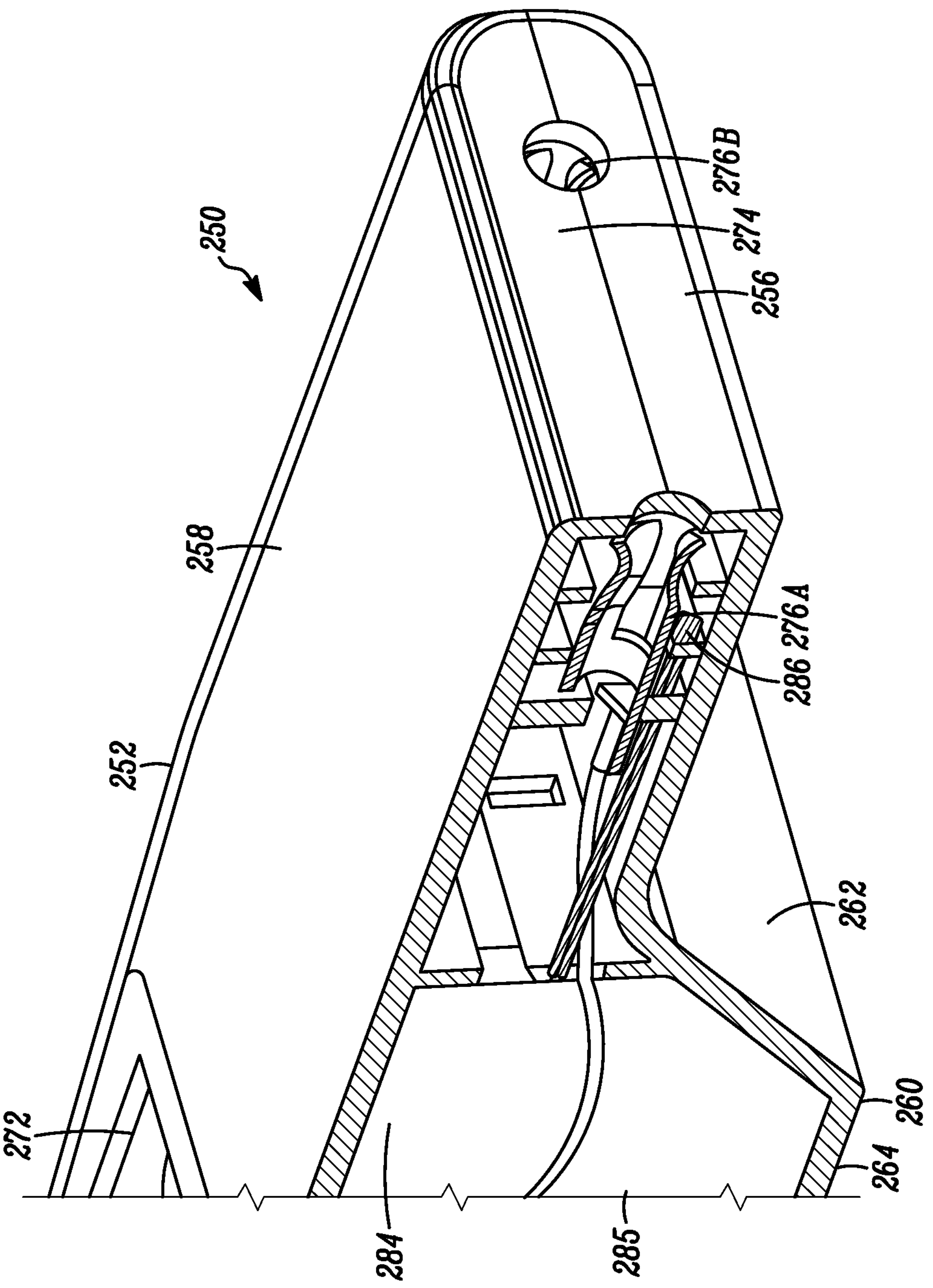
FIG. 12 is a perspective, partial section view depicting the temperature controller of FIG. 9.
Figure 13:
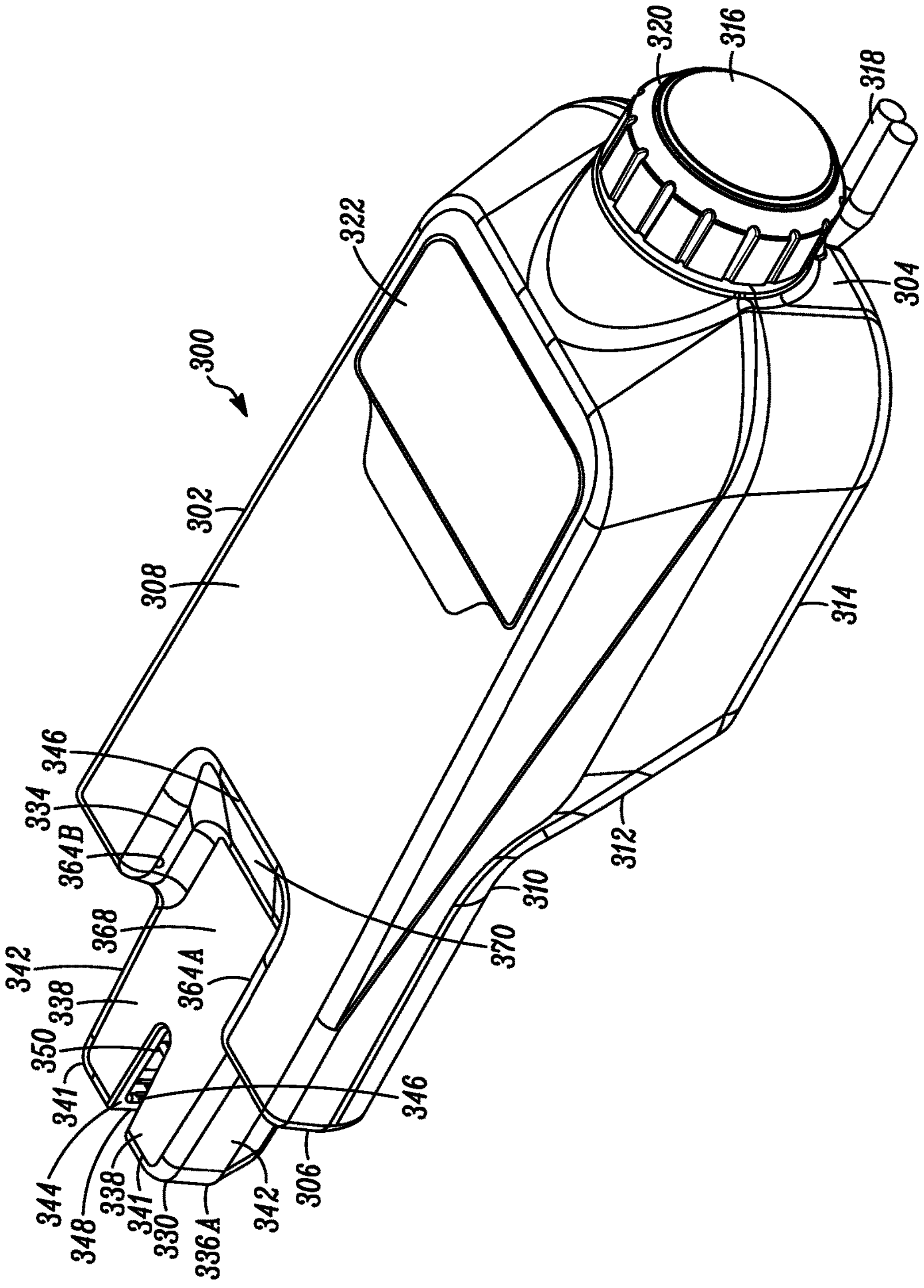
FIG. 13 is a top perspective view depicting a temperature controller according to another representative embodiment of the present disclosure.
Figure 14:
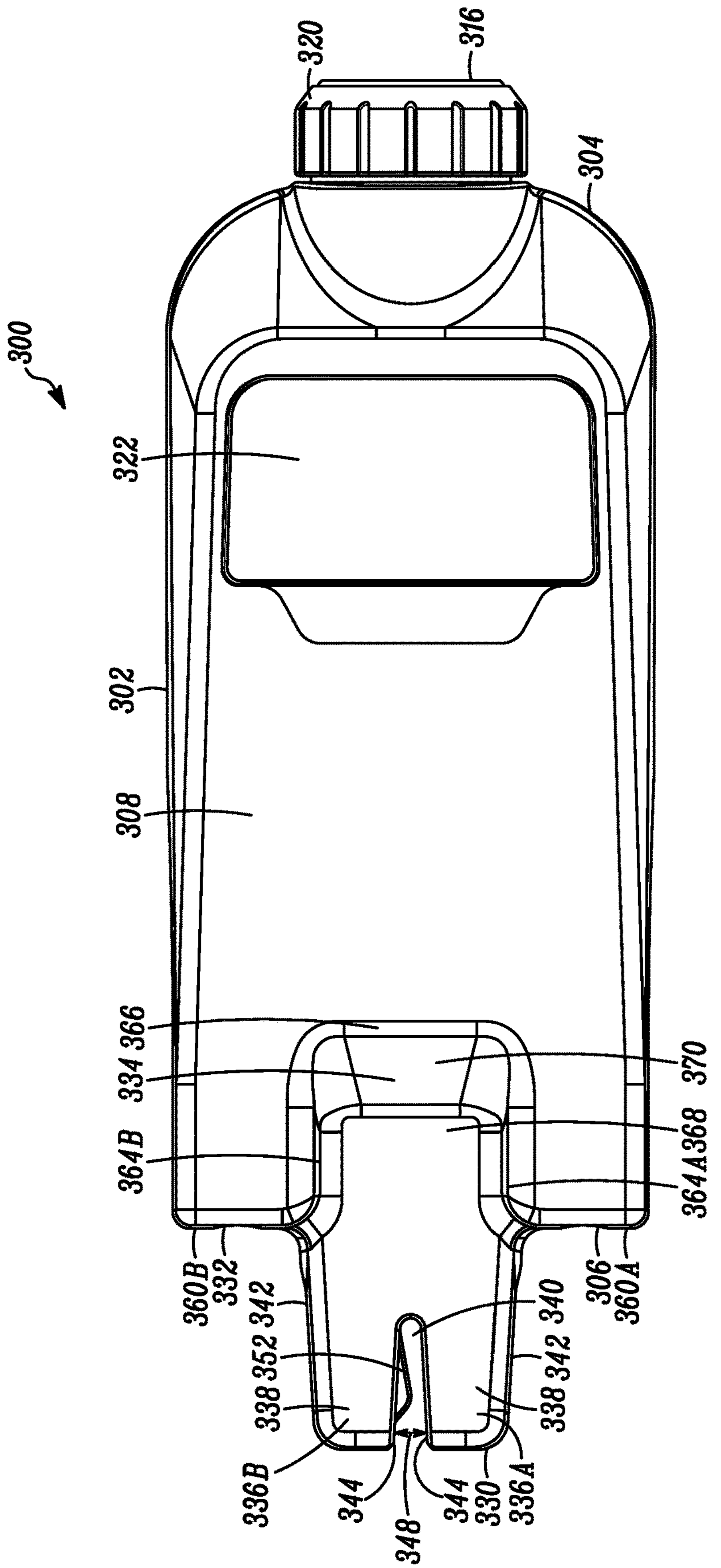
FIG. 14 is a top view depicting the temperature controller of FIG. 13.
Figure 15:
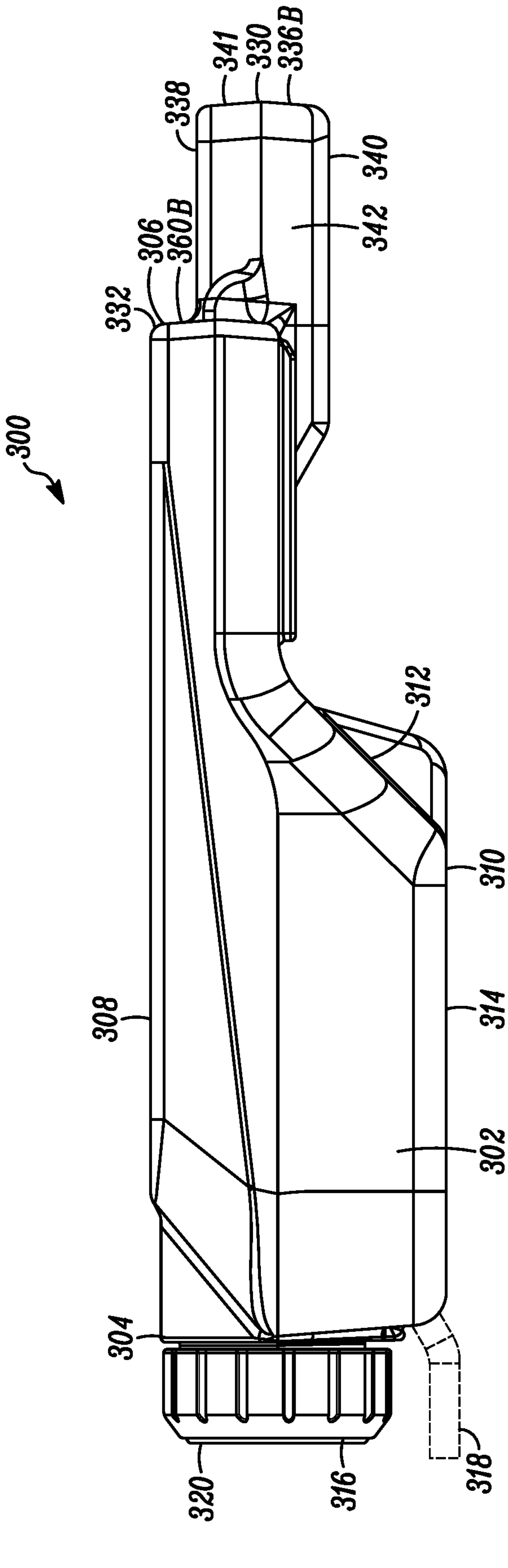
FIG. 15 is a right side view depicting the temperature controller of FIG. 13.
Figure 16:
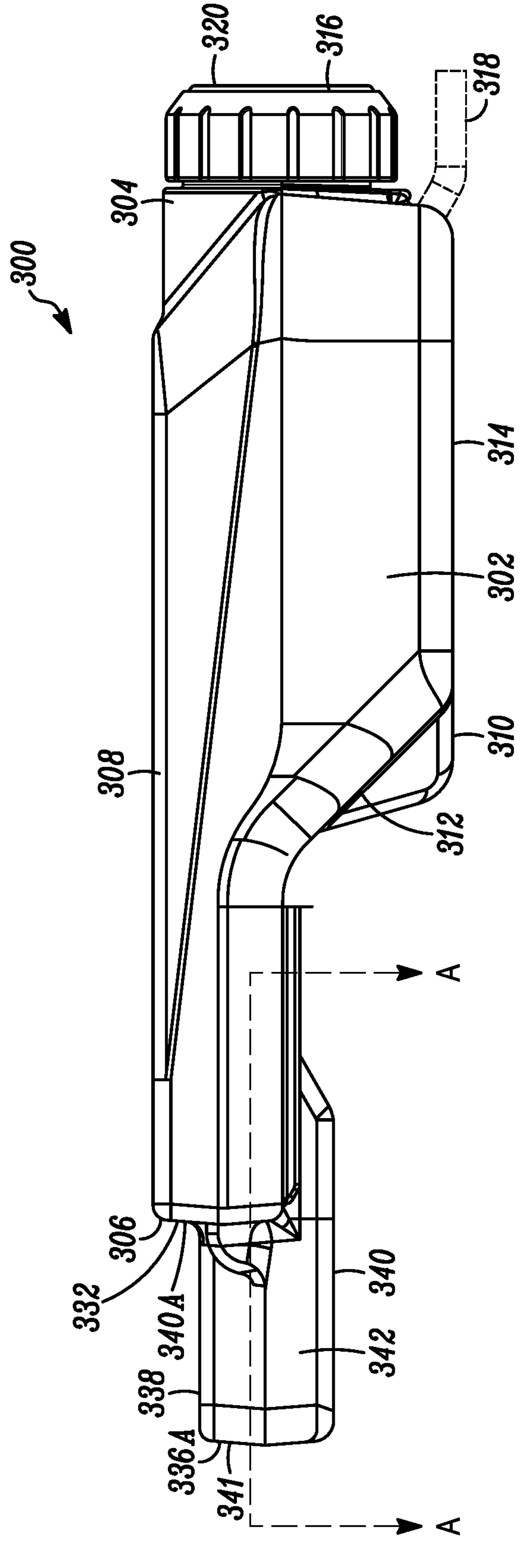
FIG. 16 is a left side view depicting the temperature controller of FIG. 13
Figure 17:
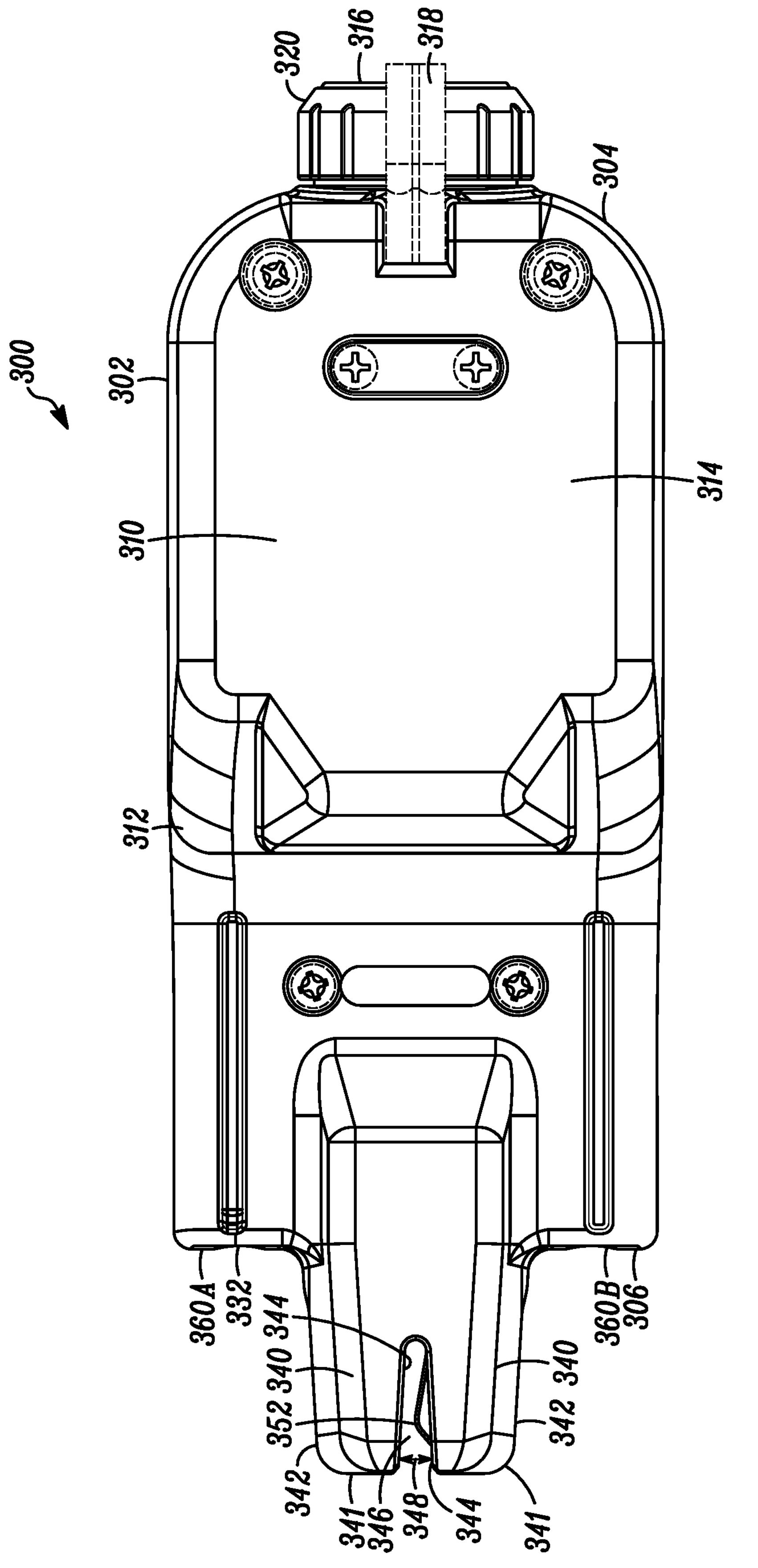
FIG. 17 is a bottom view depicting the temperature controller of FIG. 13.
Figure 18:
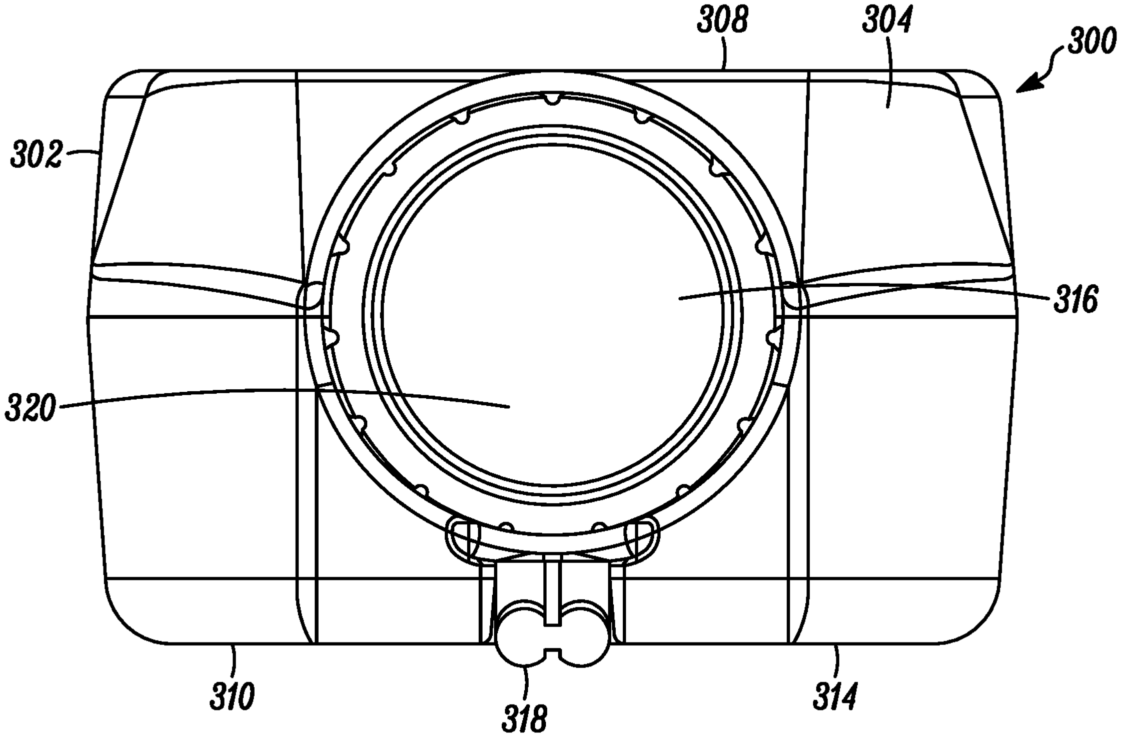
FIG. 18 is a front view depicting the temperature controller of FIG. 13.
Figure 19:
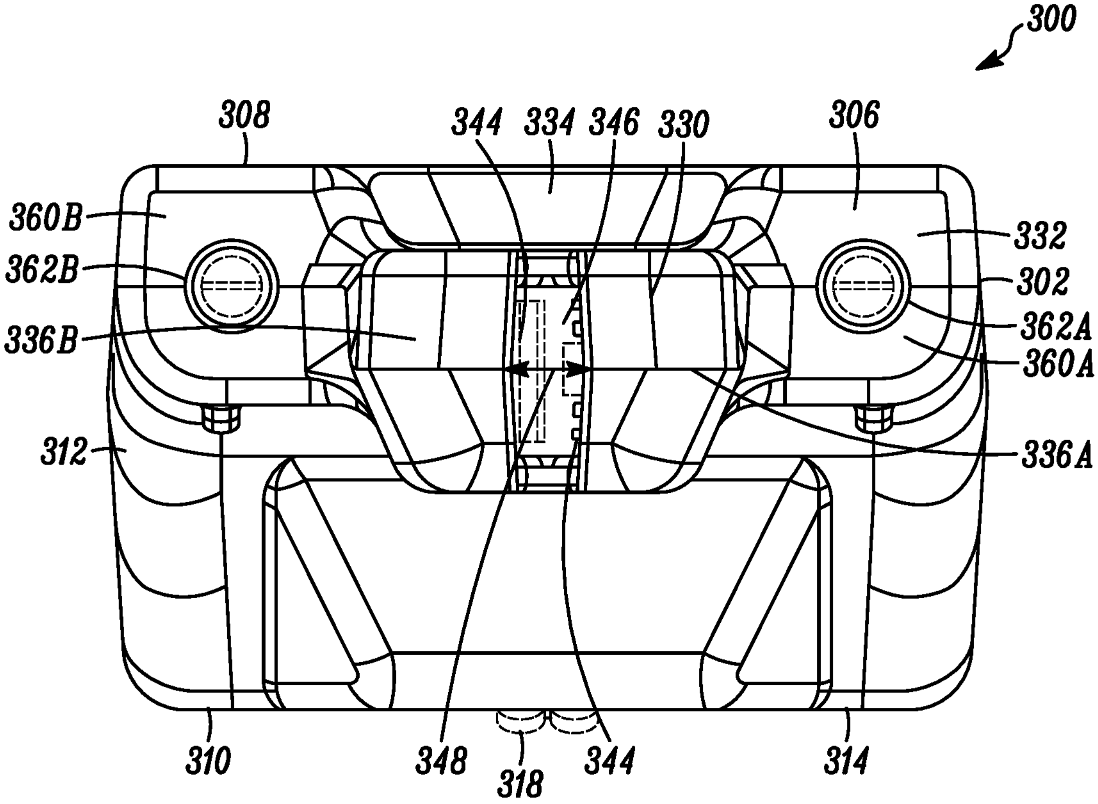
FIG. 19 is a rear view depicting the temperature controller of FIG. 13.

With specific reference to FIG. 12, controller body 252 generally defines a body interior 284. Mounted within the body interior 284 is a thermostat 285 and a temperature sensor 286 positioned either in proximity to or in direct contact with electrical contact 276*a*. The temperature sensor 286 can comprise any of a variety of suitable sensor designs including, for example, a Negative Temperature Coefficient (NTC) thermistor, a Resistive Temperature Detector (RTD), a thermocouple or an infrared sensor or thermopile. The temperature sensor 286 can be operably connected to the thermostat to 85, user input 266 and temperature display 272, such that the temperature of the electrical contact 276*a* can be measured and compared to the temperature input by a user using the user input 266 and consequently, can be selectively supplied to the resistive heating element 146 through the electrical contacts 276*a*, 276*b*. In this manner, the operational temperature of the countertop appliance 130 is measured and controlled by measuring the electrical contact 276*a* which is in direct thermal connection with resistive heating element 146 during operation. Temperature sensor 286 avoids self-heating and heat retention such that the temperature sensor 286 avoids coloring or impacting a response provided to a temperature control. As such, any heat sink delays attributed to the mass of the cooking surface 136 are avoided.

Another representative embodiment of an improved countertop appliance temperature controller 300 is illustrated within FIGS. 13-23. Generally, temperature controller 300 can comprise a controller body 302 having a control end 304 and a connection end 306. The controller body 302 can further comprise an upper surface 308 and a lower surface 310. The lower surface 310 can comprise a transition portion 312 between the connection end 306 and a support surface 314 of the lower surface 310. The control end 304 can include a user input 316 and an electrical cord 318. The user input 316 can comprise any of a variety of suitable input mechanisms including a rotating knob 320 as illustrated or alternatively, a rotating dial, buttons or a touchscreen. Alternatively, the user input 316 can comprise a signal receiver for receiving external commands such as, for example, from a downloadable application on a smart phone or tablet computer via Bluetooth communications or the like. The upper surface 308 can include a temperature display 322 for displaying one or both of a temperature setpoint and an actual cooking temperature.

Figure 20:
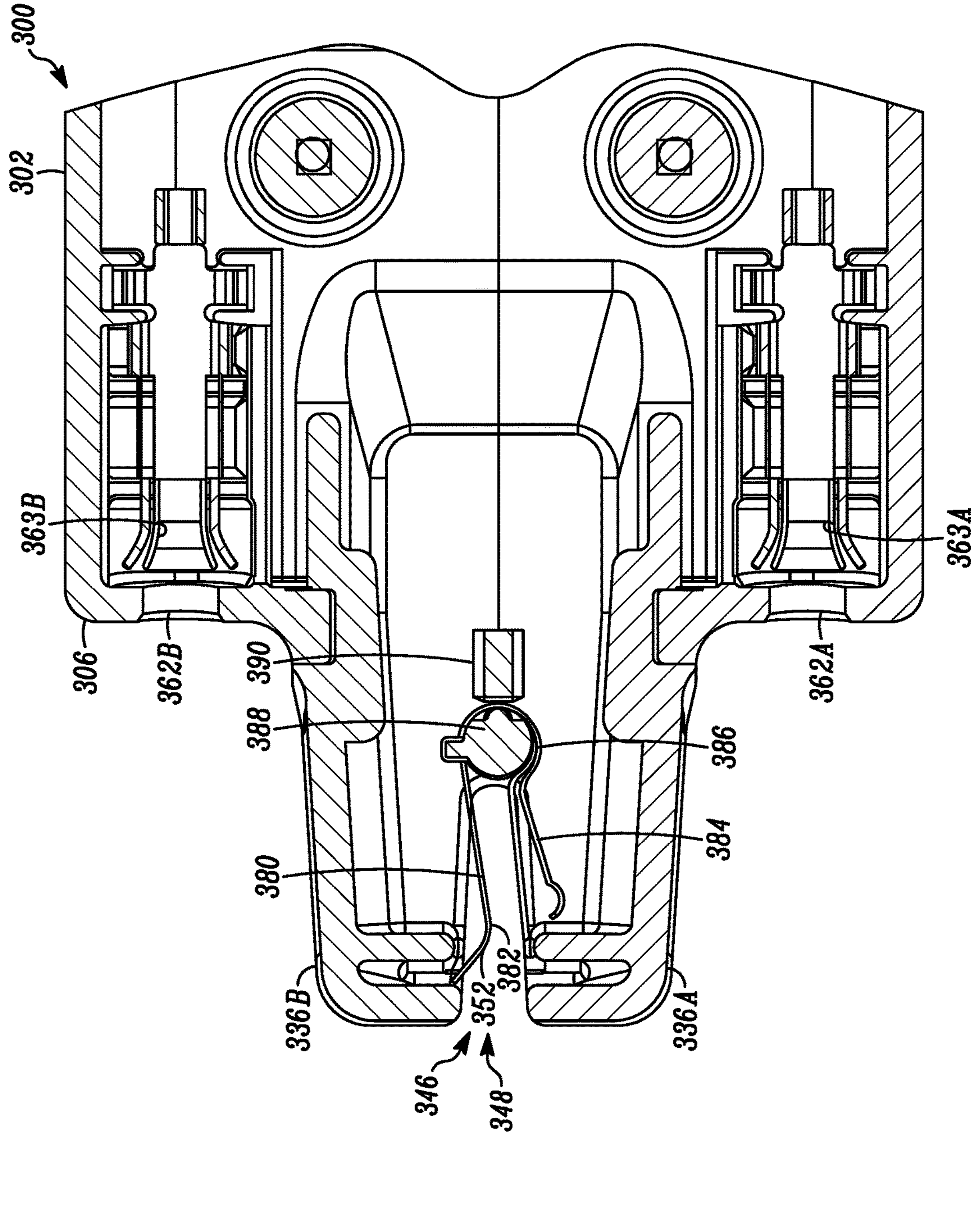
FIG. 20 is a partial section view depicting the temperature controller of FIG. 13 taken at line A-A of FIG. 16
Figure 21:
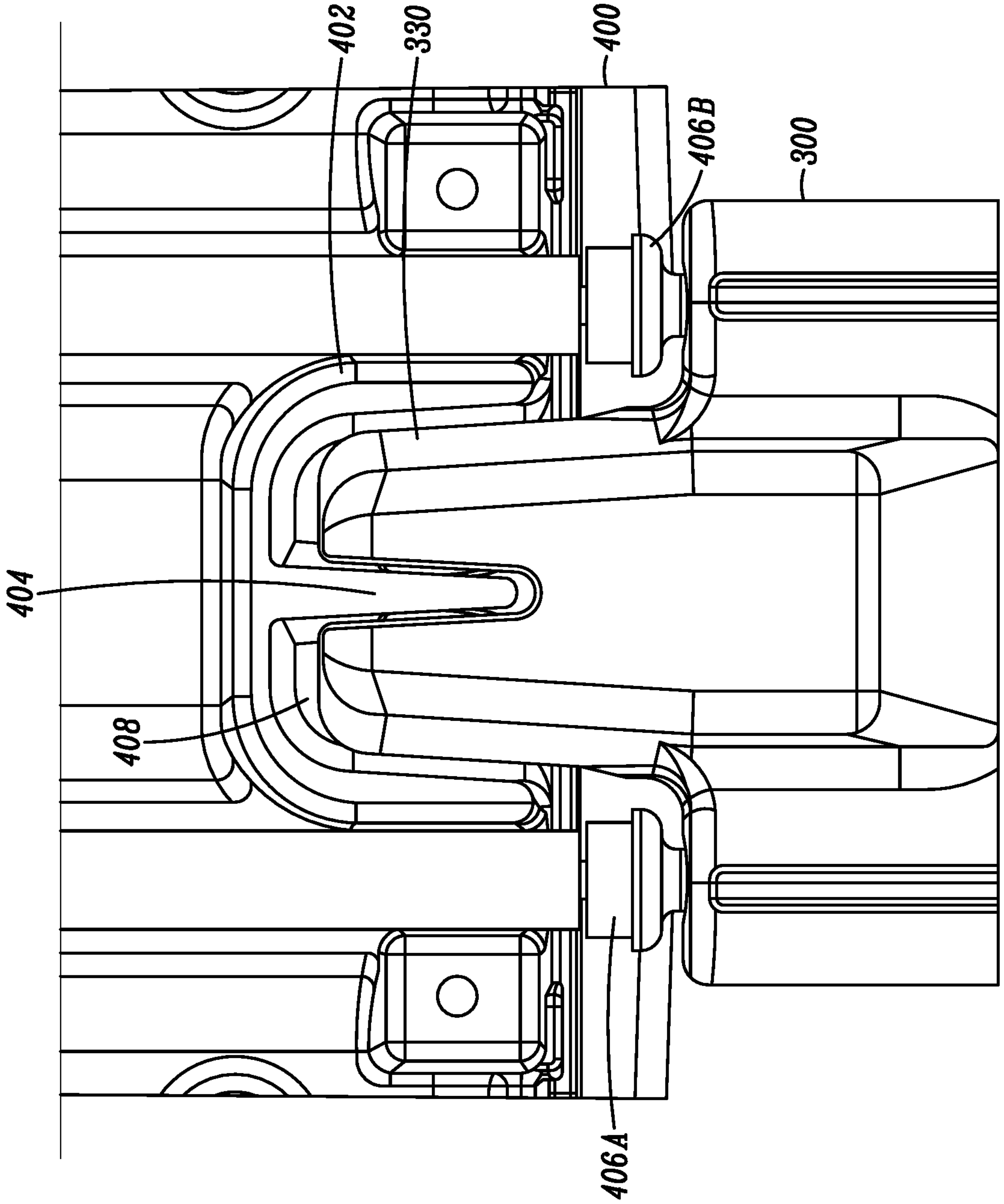
FIG. 21 is a partial section view depicting the temperature controller of FIG. 13 connected to a countertop appliance.
Figure 22:
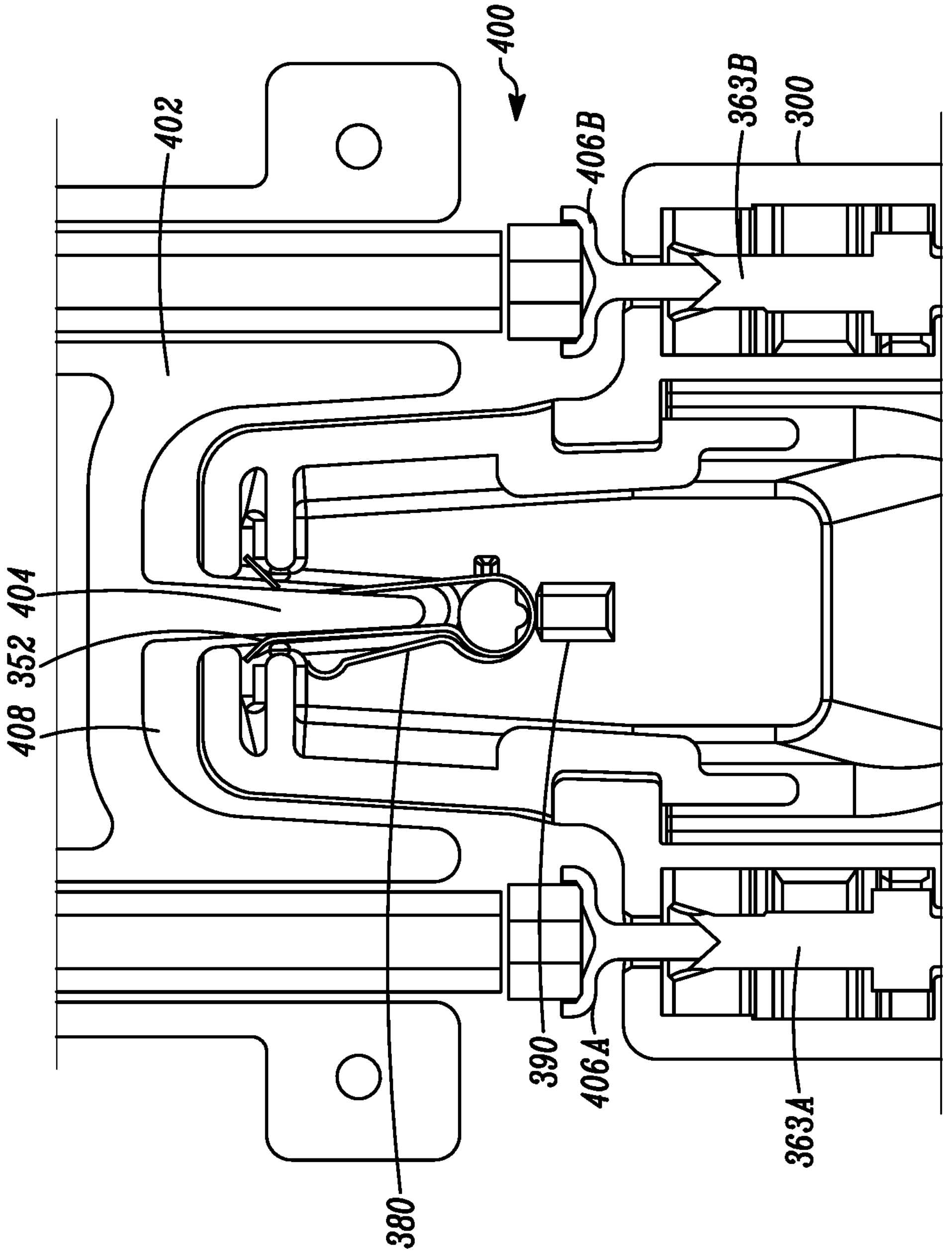
FIG. 22 is a partial section view depicting the temperature controller of FIG. 13 connected to a countertop appliance.

As seen in FIGS. 13-17 and 19-23, the connection end 306 can generally be defined by a projecting portion 330, an engagement wall 332 and an engagement recess 334. The projecting portion 330 generally comprises a pair of opposed projecting members 336*a*, 336*b*, each of which comprise an upper guide surface 338, a lower guide surface 340, a projecting end wall 341, an exterior guide surface 342 and interior cavity surfaces 344. Generally, the opposed projecting members 336*a*, 336*b* define an engagement cavity 346 defining an engagement opening 348 between the projecting members 336*a*, 336*b*. Generally, at least one of the projecting members 336*a*, 336*b* defines a wall aperture 350, through that allows a sensing member 352 to extend into the engagement cavity 346. The engagement wall 332 generally defines a pair of engagement surfaces 360*a*, 360*b* having a pair of engagement apertures 362*a*, 362*b*. As seen in FIGS. 20-22, each engagement aperture 362*a*, 362*b* includes an electrical contact 363*a*, 363*b* in electrical communication with the electrical cord 318. The engagement recess 334 can include a pair of recess side walls 364*a*, 364*b* and a recess end wall 366 that cooperatively define a recess cavity 368. The recess end wall 366 can include a tapered recess wall 370 that extends between the upper guide surface 338 and the upper surface 308 of the controller body 302.

Figure 23:
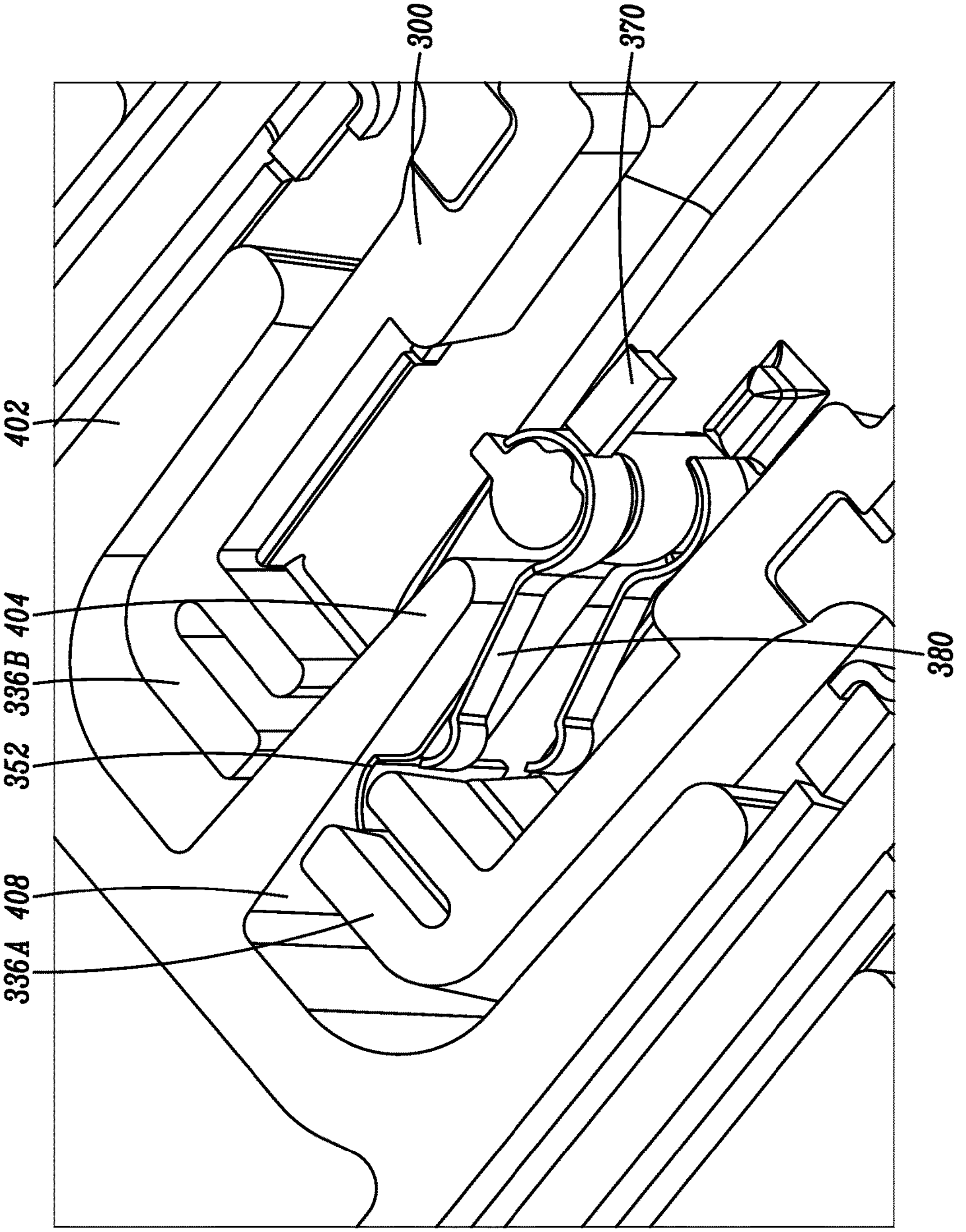
FIG. 23 is a partial section view depicting the temperature controller of FIG. 13 connected to a countertop appliance.

With specific reference to FIGS. 20 and 22-23, the sensing member 352 can comprise a temperature conducting member 380 formed of an appropriate conductive material such as, for example, copper or aluminum based materials. The temperature conducting member 380 can generally define a resilient member including an exposed portion 382 that extends through the wall aperture 350 and is resiliently exposed within the engagement cavity 346. In one representative embodiment, the temperature conducting member 380 can be configured as one or more resilient spring clips 384 including the exposed portion 382 and a mounting portion 386. The mounting portion 386 generally mounts to an internal mounting post 388 defined between the upper surface 308 and the lower surface 310 of the controller body 302. The temperature conducting member 380 can include an integral temperature sensor 390, for example, a Negative Temperature Coefficient (NTC) thermistor such that the integral temperature sensor 390 is in direct contact with or in close proximity to the temperature conducing member 380. Other suitable temperature sensors including, for example, a Resistive Temperature Detector (RTD), a thermocouple or an infrared sensor or thermopile, can be utilized as well. In this way, the integral temperature sensor 390 is located within the controller body 302 itself and away from the appliance and spaced apart from the engagement wall 332 and the projecting end walls 341. The integral temperature sensor 390 can avoid self-heating and heat retention so as to avoid coloring or impacting a response provided to a temperature control.

Connection of the temperature controller 300 to a countertop appliance 400 is generally illustrated in FIGS. 21-23. In use, the temperature controller 300 is generally positioned proximate a mounting block 402 of the countertop appliance 400. The mounting block 402 generally will differ from the conventional mounting block 148, in that the mounting block 402 includes a projecting rib 404 that is slightly undersized with respect to the size and shape of the engagement cavity 346. The projecting rib 404 is preferably formed integrally with the cooking surface 136 such that the projecting rib 404 is the same temperature as the cooking surface 136. As the projecting portion 330 is advanced into the mounting block 402, the projecting rib 404 is guided into the engagement opening 348 and is forced into contact with the sensing member 352. The resilient nature of the temperature conducting member 380 enables the projecting members 336*a*, 336*b* to be fully inserted into the mounting block 402, while maintaining continual contact of the sensing member 352 with the projecting rib 404. As the projecting portion 330 is inserted into the mounting block 402, heating connectors 406*a*, 406*b* on the countertop appliance 400 are inserted into the corresponding electrical contacts 363*a*, 363*b*. In a preferred embodiment, projecting rib 404 is only in direct contact with the sensing member 352 when the temperature controller 300 is fully engaged with the mounting block 402 so as to define an air gap 408 between the connection end 306 and the portion of the mounting block 402 that are at the temperature of the cooking surface 136 such that the controller body 302 can be fabricated of appropriate high temperature thermoplastic or thermoset polymeric materials.

When the temperature controller 300 is operably engaged to the countertop appliance 400, the integral temperature sensor 390 can sense the temperature of the temperature conducting member 382 which is in direct contact with the projecting rib 404. The integral temperature sensor 390 communicates the temperature to a thermostat or digital processor within the temperature controller 300 and selectively powers the connected electrical contacts 363*a*, 363*b* and heating connectors 406*a*, 406*b* depending upon what the user has requested using the user input 316.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An appliance temperature controller, the temperature controller comprising:

at least two electrical output contacts selectively coupleable to an appliance;

a user input configured to receive a desired temperature setpoint;

a temperature sensor in thermal communication with a temperature conducting member, the temperature conductive member adapted to receive a projecting rib formed in a cook surface portion of the appliance such that the temperature sensor receives temperature information from the cook surface via the projecting rib, the temperature sensor positioned such that it does not receive temperature information from the projecting rib directly;

a mounting block positioned between the temperature sensor and an engagement opening configured to receive the projecting rib, the mounting block forming a barrier between the temperature sensor and the engagement opening; and a thermostat configured to adjust an electrical output of at the least two of the electrical output contacts to minimize a difference between the desired temperature setpoint and a measured temperature of the projecting rib based on the received temperature information.

2. The temperature controller of claim 1, wherein the temperature sensor is a low thermal capacitance sensor configured to minimize heat retention.

3. The temperature controller of claim 1, wherein the temperature sensor is at least one of a negative coefficient thermistor, resistive temperature detector (RTD), a thermocouple, and a thermopile.

4. The temperature controller of claim 1, wherein the user input is at least one of a rotating temperature control dial, one or more buttons, a touchscreen, and/or a signal receiver configured to receive external commands from a remote device.

5. The temperature controller of claim 1, further comprising a display configured to display the desired temperature setpoint, received temperature information, a perceived actual temperature of the cooking surface, or a combination thereof.

6. The temperature controller of claim 1, wherein an enclosure surrounds the temperature sensor, the enclosure having an engagement wall at a first surface comprising the least two electrical output contacts, the enclosure extending to second surface comprising a projecting end wall surface, the temperature conductive material being housed in a portion of the enclosure comprising the projecting end wall, the temperature conductive material held against the temperature sensor by the mounting block such that the temperature conductive material contacts the projecting rib in a position extending beyond the least two electrical output contacts.

7. The temperature controller of claim 1, wherein the temperature conductive material is held against the projecting rib by spring tension.

8. The temperature controller of claim 1, wherein the projecting end wall comprises an engagement cavity sized to admit the projecting rib and allows the temperature conductive material to contact the projecting rib.

9. A countertop appliance having improved cooking surface temperature control, the countertop appliance comprising:

a cooking surface;

a heating element configured to heat the cooking surface; and a temperature controller comprising:

at least two electrical output contacts selectively coupleable to the heating element;

a user input configured to receive a desired temperature setpoint for the resistive heating element;

a temperature sensor in thermal communication with a temperature conducting member, the temperature conductive member adapted to receive a projecting rib formed in a cook surface portion of the appliance such that the temperature sensor receives temperature information from the cook surface via the projecting rib, the temperature sensor positioned such that it does not receive temperature information from the projecting rib directly;

a mounting block positioned between the temperature sensor and an engagement opening configured to receive the projecting rib, the mounting block forming a barrier between the temperature sensor and the engagement opening; and a thermostat configured to adjust an electrical output of at the least two of the electrical output contacts to minimize a difference between the desired temperature setpoint and a measured temperature of the projecting rib based on the received temperature information.

10. The countertop appliance of claim 9, wherein the temperature sensor is a low thermal capacitance sensor configured to minimize heat retention.

11. The countertop appliance of claim 9, wherein an enclosure surrounds the temperature sensor, the enclosure having an engagement wall at a first surface comprising the least two electrical output contacts, the enclosure extending to a second surface comprising a projecting end wall surface, the temperature conductive material being housed in a portion of the enclosure comprising the projecting end wall, the temperature conductive material held against the temperature sensor by the mounting block such that the temperature conductive material contacts the projecting rib in a position extending beyond the least two electrical output contacts.

12. The countertop appliance of claim 9, wherein the temperature conductive material is held against the projecting rib by spring tension.

13. The countertop appliance of claim 9, wherein the projecting end wall comprises an engagement cavity sized to admit the projecting rib and allows the temperature conductive material to contact the projecting rib.

14. The countertop appliance of claim 9, wherein the temperature sensor is at least one of a negative coefficient thermistor, a resistive temperature detector (RTD), a thermocouple, an infrared sensor, and a thermopile.

15. The countertop appliance of claim 9, further comprising a display configured to display at least one of the desired temperature setpoint, received temperature information, and the perceived actual temperature of the cooking surface.

16. A method of providing improved temperature control of a cooking surface of an appliance, the method comprising:

receiving a desired temperature setpoint from a user input;

placing a thermal sensor in thermal communication with a temperature conducting member, the temperature conductive member the temperature sensor positioned such that it does not receive temperature information from cooking surface directly;

causing a projecting rib formed in a cook surface portion of the appliance to become in contact with the temperature conductive member such that the temperature sensor receives temperature information from the cook surface via the projecting rib, the projecting rib prevented from contacting the temperature sensor by a barrier positioned between the temperature sensor and the projecting rib, sensing an actual temperature of the cook surface portion of the appliance via the thermal sensor;

providing a signal representing the sensed actual temperature to a thermostat;

comparing the desired temperature setpoint to the signal and adjusting an electrical output to the cooking surface of an appliance to minimize a difference between the desired temperature setpoint and an actual temperature of the cooking surface of an appliance.

17. The method of claim 16, wherein the thermal sensor is a low thermal capacitance sensor configured to minimize heat retention.

18. The method of claim 16, further comprising pressing the temperature conductive material against the projecting rib using spring tension.

19. The method of claim 16, wherein the thermal sensor is at least one of a negative coefficient thermistor, resistive temperature detector (RTD), a thermocouple, and a thermopile.

* * * * *